United States Patent
Watanabe et al.

(10) Patent No.: US 8,832,395 B1
(45) Date of Patent: Sep. 9, 2014

(54) STORAGE SYSTEM, AND METHOD OF STORAGE CONTROL FOR STORAGE SYSTEM

(71) Applicant: Hitachi, Ltd., Tokyo (JP)

(72) Inventors: Yasuo Watanabe, Tokyo (JP); Norio Shimozono, Tokyo (JP); Shunji Kawamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/233,996

(22) PCT Filed: Apr. 12, 2013

(86) PCT No.: PCT/JP2013/061093
§ 371 (c)(1),
(2), (4) Date: Jan. 21, 2014

(51) Int. Cl.
*G06F 7/575* (2006.01)
*G06F 11/10* (2006.01)
*G06F 3/06* (2006.01)

(52) U.S. Cl.
CPC .............. *G06F 3/065* (2013.01); *G06F 3/0683* (2013.01); *G06F 3/0604* (2013.01)
USPC .......................................... 711/161; 711/162

(58) Field of Classification Search
CPC ............ G06F 9/30029; G06F 12/0804; G06F 11/1076; G06F 2211/1054; G06F 3/064
See application file for complete search history.

(56) References Cited

U.S. PATENT DOCUMENTS

| | | | | |
|---|---|---|---|---|
| 4,183,463 | A * | 1/1980 | Kemmetmueller | 714/804 |
| 7,487,394 | B2 * | 2/2009 | Forhan et al. | 714/15 |
| 7,752,402 | B2 * | 7/2010 | Fachan et al. | 711/161 |
| 2005/0166016 | A1 | 7/2005 | Morimoto | |
| 2005/0216682 | A1 * | 9/2005 | Shinozaki et al. | 711/162 |
| 2006/0206542 | A1 * | 9/2006 | Wolfgang et al. | 707/203 |
| 2009/0254507 | A1 | 10/2009 | Hosoya et al. | |

FOREIGN PATENT DOCUMENTS

| | | |
|---|---|---|
| JP | 10-124359 A | 5/1998 |
| JP | 2002-358222 A | 12/2002 |
| JP | 2005-215850 A | 8/2005 |
| JP | 2005-275494 A | 10/2005 |
| JP | 2006-260563 A | 9/2006 |
| JP | 2009-251725 A | 10/2009 |

* cited by examiner

*Primary Examiner* — Matthew Bradley
*Assistant Examiner* — Candice Rankin
(74) *Attorney, Agent, or Firm* — Volpe and Koenig, P.C.

(57) ABSTRACT

A controller receives new data which is data updated from old data, stores the received new data in a memory, reads the old data from a first storage medium group and stores the old data read into the memory, generates transfer data which is used to replicate in the subsidiary storage system new data with less information than the new data on the basis of a difference between the old data and the new data in the memory and transmits the transfer data to the subsidiary storage system, reads the old parity and stores it in the memory, and generates new parity which is parity updated from the old parity on the basis of the old parity in the memory and XOR data which is the exclusive logical sum of the new data and old data in the memory, and stores the new parity in the first storage medium group.

7 Claims, 27 Drawing Sheets

Cache slot management table

| ID | State | Necessary data lost bitmap | XOR data bitmap |
|---|---|---|---|
| 1 | | | |
| 2 | | | |
| : | : | : | : |

Transfer data management table — 1500

| ID | Write information/write sequence number | Subblock change presents bitmap | Information quantity reduction process completion flag |
|---|---|---|---|
| 1 | | | |
| 2 | | | |
| : | : | : | : |

System information management table — 1700

| Item | Value |
|---|---|
| Write sequence number | |
| Cache resident quantity | |
| Journal data cumulative amount | |
| Subblock size | |
| Synchronous information quantity reduction flag | |
| Information quantity reduction process identification | |
| Information quantity reduction process timing | |
| Acceptance flag for XOR data in cache memory | |

1701 — Write sequence number
1702 — Cache resident quantity
1703 — Journal data cumulative amount
1704 — Subblock size
1705 — Synchronous information quantity reduction flag
1706 — Information quantity reduction process identification
1707 — Information quantity reduction process timing
1708 — Acceptance flag for XOR data in cache memory

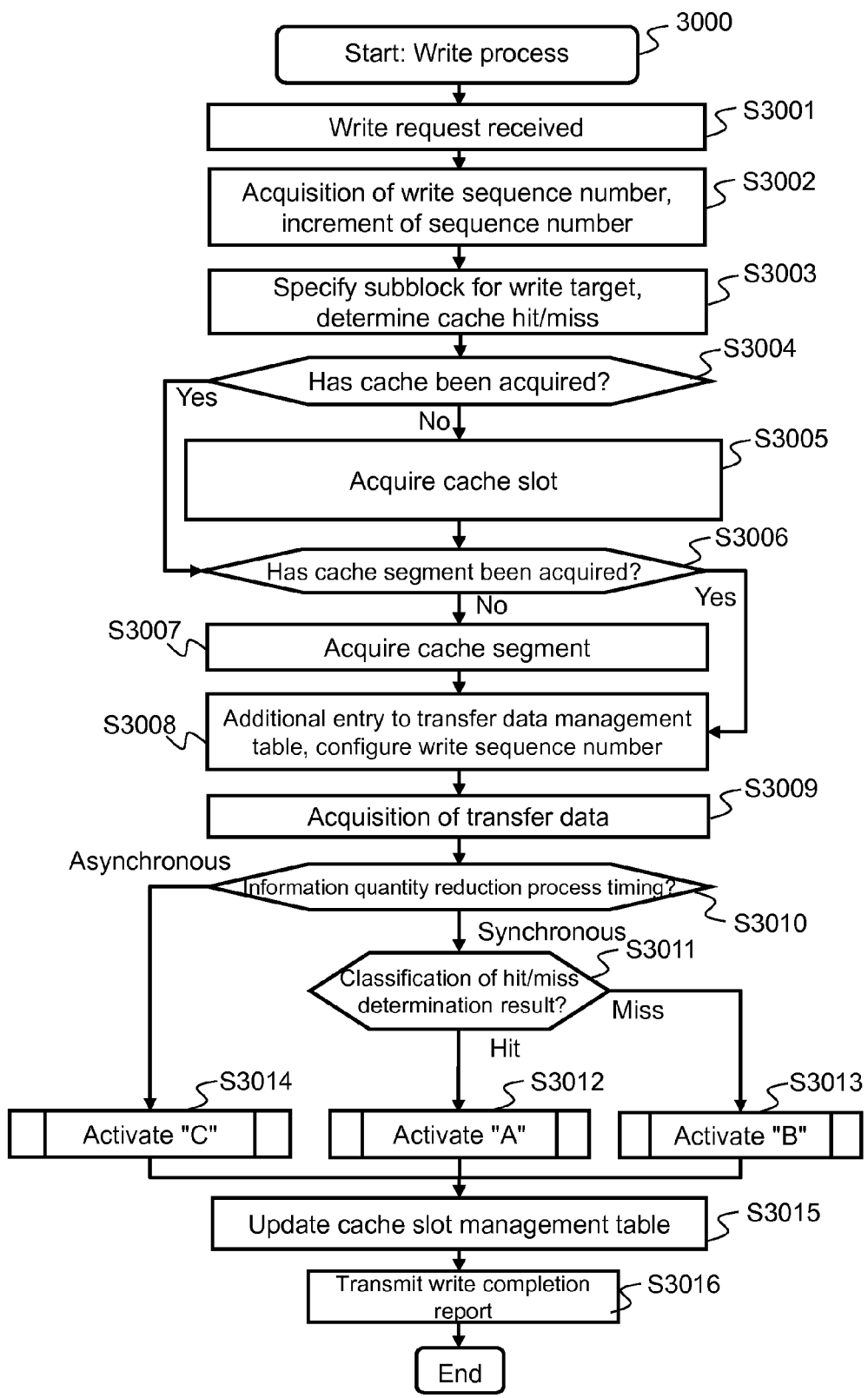

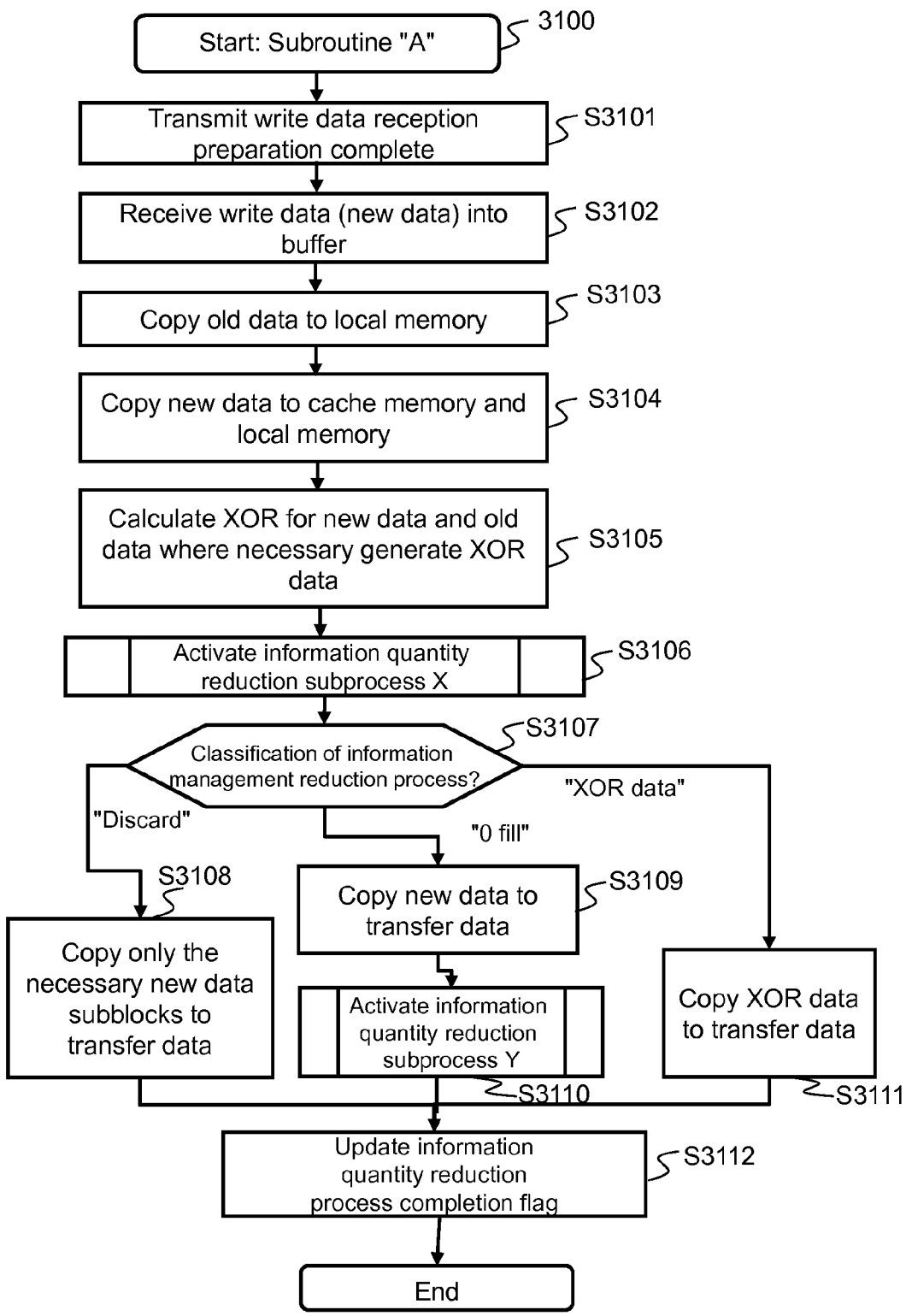

Fig. 10

| # | Patterns of data used in "information quantity reduction subroutine X" | | | | |
|---|---|---|---|---|---|
| | New data | Old data | XOR data | New data guarantee code | Old data guarantee code |
| (a) | | | ○ | | |
| (b) | ○ | ○ | | | |
| (c) | | | ○ | ○ | ○ |
| (d) | ○ | ○ | | ○ | ○ |

○ : Used

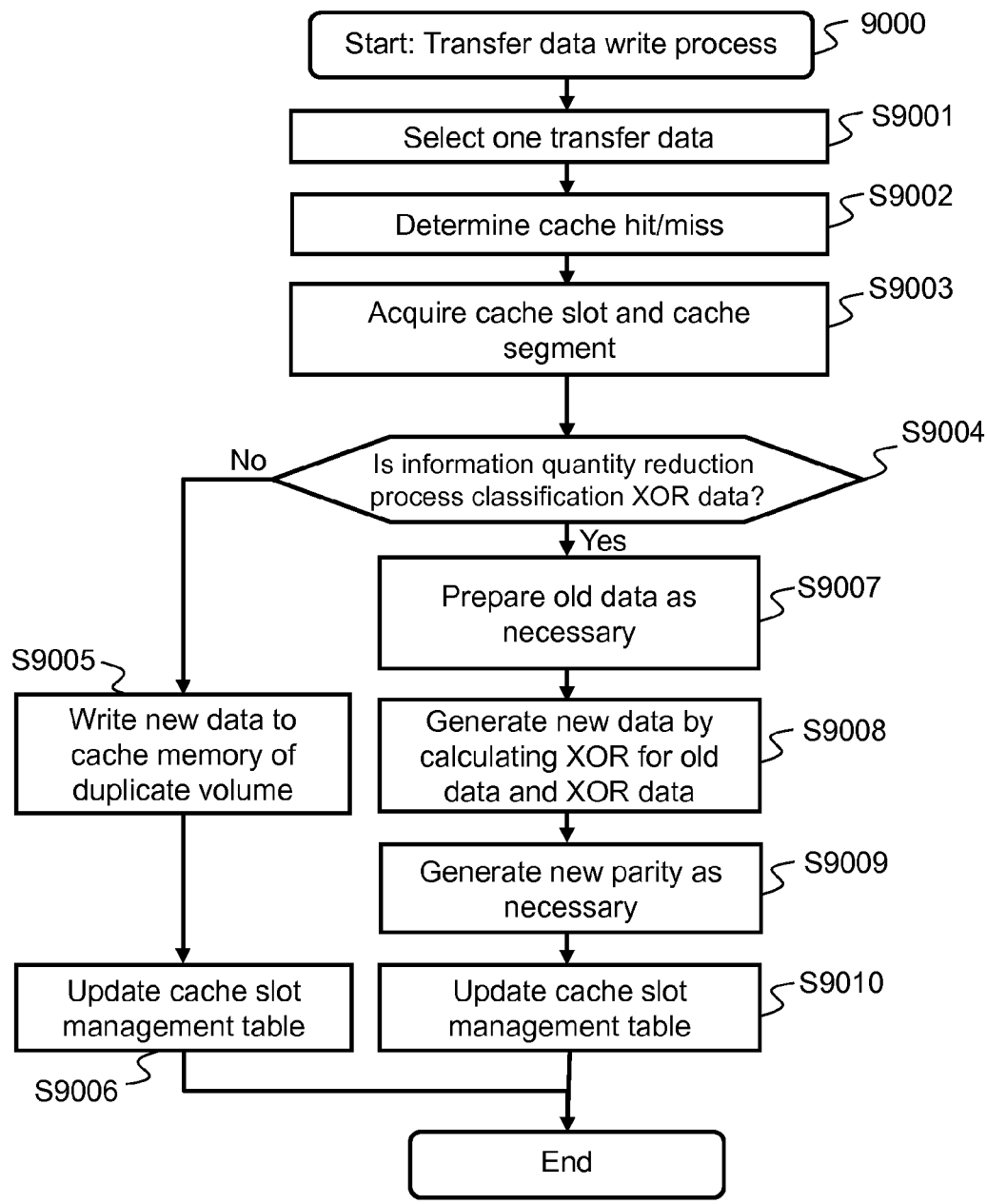

STORAGE SYSTEM, AND METHOD OF STORAGE CONTROL FOR STORAGE SYSTEM

TECHNICAL FIELD

The invention relates to technology for reducing the amount of data transferred during remote copying, which is a technique for duplicating data between main and subsidiary storage apparatuses.

BACKGROUND ART

With computer systems in organizations providing a service for financial institutions and the like which demand continuous operation 24 hours a day, 365 days a year, a technology known as remote copying is widely employed which duplicates logical volumes of data between two storage apparatuses located in sites remote from one another but coupled via WAN (Wide Area Network) to enable continuous operation.

With computer systems which perform remote copying, data is duplicated between a master volume in a storage apparatus at the main base and a duplicate volume in a subsidiary storage at a backup base. Thus should any damage occur to the main storage, the subsidiary storage can continue to provide a processing service, enabling an organization such as a financial institution to have a computer system that operates continuously.

With the expansion in the quantity of data and the increased performance of storage apparatuses in recent years, there has been a continuing increase in the quantities of data transferred via WAN during remote copying. Technology such as that disclosed in PTL 1 (Japanese Patent Application Publication No. 2002-358222), for example, can be cited as a technique for reducing the quantity of data transferred via WAN during remote copying.

With the technology disclosed in PTL 1, the main storage is provided with a copy volume which, at the point where data is synchronized between the master volume and the duplicate volume (hereinafter master/duplicate volume), contains content identical to the duplicate volume (known as the old data). In resynchronization of the master/duplicate volume, the main storage transfers compressed exclusive logical sum (XOR) data to the subsidiary storage in which XOR data generated by calculating the XOR for the old data in the copy volume and the data in the master volume (new data which contains data written in since the previous synchronization) has been compressed, the new data being replicated on the subsidiary storage side using the compressed XOR data that has been transferred.

Where few parts have changed between the old and new data, the XOR data contains a large number of "0" bit values. In other words, it can be said that the quantity of information (entropy in the information theory) in the XOR data is small compared to the new data. Thus the size of the compressed XOR data is less than the size of the compressed new data, and the quantity of data transferred via the WAN can be reduced.

CITATION LIST

Patent Literature

[PTL 1]
Japanese Patent Application Publication No. 2002-358222

SUMMARY OF INVENTION

Technical Problem

However, with the technology disclosed in PTL 1, the main storage is required to maintain a copy volume within the main storage containing content identical to the duplicate volume at the time the master/duplicate volumes were synchronized. In other words, with PTL 1 there is the difficulty that a storage area the same size as the master volume is taken up due to the copy volume.

Solution to Problem

The main storage system is provided with a first storage medium group formed of a plurality of first storage media, and a controller having a memory temporarily storing data comprising the prescribed number of subblocks stored in the first memory medium group. The main storage system communicates with a subsidiary storage system having a second storage medium group. The second storage medium group is formed of a plurality of second storage media containing second storage media in which data identical to the data stored in any of the first storage media in the first storage medium group is stored. The controller receives new data from higher-level apparatus which is data updated from the old data that is data stored in any of the first storage media of the first storage medium group, storing the received new data in the memory. The controller reads the old data from the first storage medium group, and stores the old read data in the memory. The controller generates transfer data which is the data used to replicate in the subsidiary storage system new data with a quantity of information less than the new data on the basis of the difference between the old data and the new data in the memory, and transmits the transfer data to the subsidiary storage system. The controller reads old parity which is a parity corresponding to the old data from the first storage medium group, and stores in the memory the old read parity. The controller generates a new parity which is a parity updated from the old parity on the basis of the old parity in the memory and the XOR data which is the exclusive logical sum of the new data and old data in the memory, and stores the new parity in the first storage medium group.

Advantageous Effects of Invention

With a remote copying system which remotely copies data from a main storage system to a subsidiary storage system, there is no need for the main storage system to have a copy volume. Moreover, when transferring data via a specified network (for example WAN (Wide Area Network)) from the main storage system to the subsidiary storage system, it is possible to reduce the quantity of data flowing in the communication network.

BRIEF DESCRIPTION OF DRAWINGS

FIG. 5 is a diagram illustrating a configuration of the cache slot management table for Embodiment 1 and Embodiment 2.

FIG. 6 is a diagram illustrating a configuration of the transfer data management table in Embodiment 1 and Embodiment 2.

FIG. 7 is a diagram illustrating a configuration of the system information management table in Embodiment 1 and Embodiment 2.

FIG. 8 is a diagram illustrating a flowchart of the write process in Embodiment 1.

FIG. 9 is a diagram illustrating a flowchart for subroutine "A" in Embodiment 1 and Embodiment 2.

FIG. 10 is a table illustrating the patterns of data used in information quantity reduction subprocess X in Embodiment 1 and Embodiment 2.

FIG. 20 is a diagram illustrating a flowchart for the transfer data write process in Embodiment 1.

DESCRIPTION OF EMBODIMENTS

Figure 1:
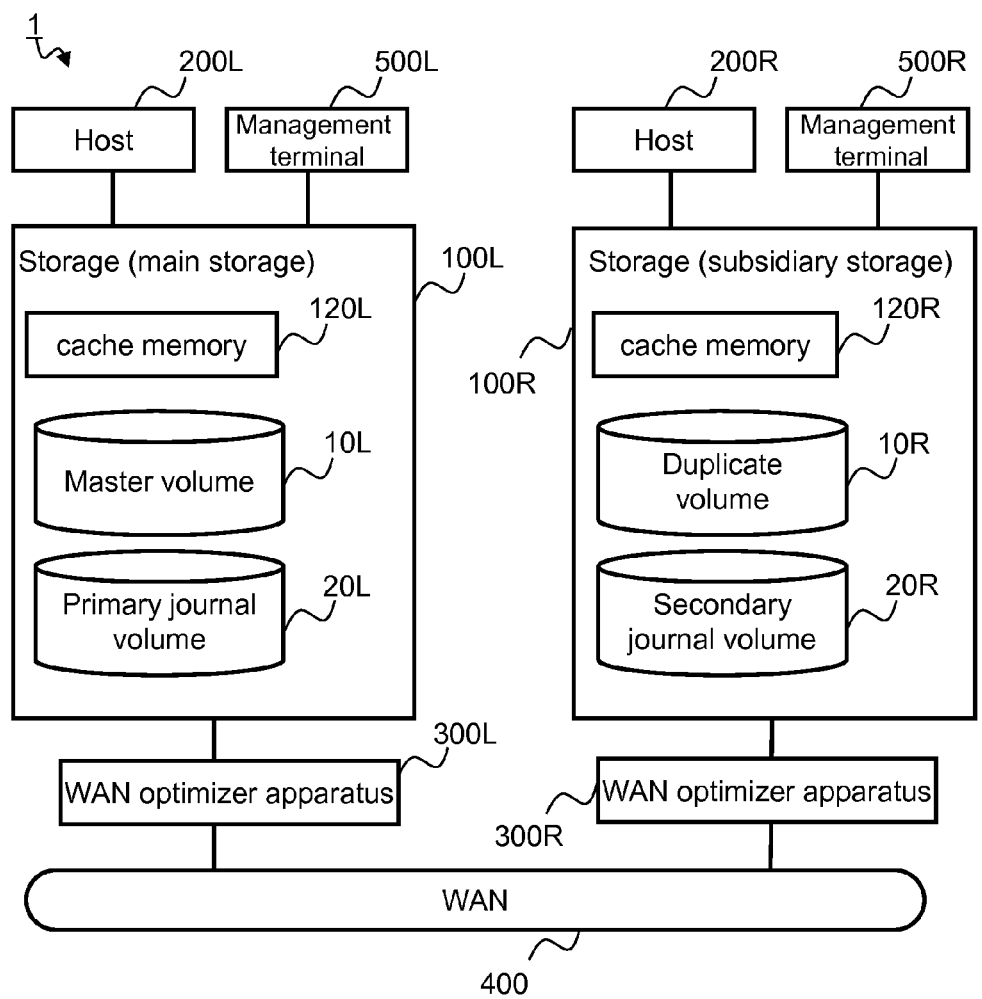
FIG. 1 is a diagram illustrating a configuration of the computer system in Embodiment 1 and Embodiment 2.

Several embodiments will now be described in detail with reference to the drawings. It should be noted that for all of the diagrams used to explain the embodiments, corresponding elements bear in principle the same reference numerals, and that repeated descriptions will be omitted. Where a program or a function is the subject of a sentence in the description, in practice the process is executed by a processor or circuit which executes the program. Moreover, where a description makes a distinction between identical elements, the description will use all the reference keys (a combination of parent/child labels) attached to an identical element (for example host 200L, host 200R), and where no distinction is made in the description of an identical element, there will be cases where only the parent label of the reference keys attached to the identical element is used (for example, host 200).

Embodiment 1

The computer system of Embodiment 1 will be described using FIGS. 1 to 20, and FIGS. 25 to 27.

Embodiment 1 shows a structure which performs synchronous remote copying with computer system 1. In Embodiment 1, main storage 100L transfers the transfer data in a reduced and compressed form via WAN without having a copy volume of master volume 10L, and is able to synchronize the contents of master/duplicate volumes 10L, 10R. As will be described later, Embodiment 1 corresponds to the patterns in FIGS. 27(*a*) to 27(*d*).

FIG. 1 shows the configuration of the computer system in Embodiment 1.

Computer system 1 comprises main storage 100L, host 200L, WAN optimizer apparatus (WAN optimizer or WAN accelerator) 300L, WAN 400, subsidiary storage 100R, host 200R, WAN optimizer apparatus 300R, management terminal 500L, and management terminal 500R.

The coupling of the components within computer system 1 will now be described. Host 200L and main storage 100L, host 200R and subsidiary storage 100R, main storage 100L and WAN optimizer apparatus 300L, and subsidiary storage 100R and WAN optimizer apparatus 300R are all coupled via a fibre channel storage network (Storage Area Network) not shown in the diagram. Data or requests for processing are received and exchanged between these apparatuses via the fibre channel network. Here a communication network such as a leased line may be used in place of the fibre channel network.

WAN optimizer apparatus 300L and WAN optimizer apparatus 300R are coupled via WAN 400 (Wide Area Network) which is a communication network coupling remote sites. WAN optimizer apparatus 300L and WAN optimizer apparatus 300R transfer data and processing requests via WAN 400.

Services that can be used for the WAN include a leased line service/circuit switching service/packet exchange service. Moreover, communication protocols that can be used for the WAN include ATM (Asynchronous Transfer Mode) and Ethernet (registered trademark).

Main storage 100L, host 200L, WAN optimizer apparatus 300L, and managing terminal 500L are coupled by a first LAN (Local Area Network). Moreover, subsidiary storage 100R, host 200R, WAN optimizer apparatus 300R, and management terminal 500R are coupled by a second LAN. The first LAN and second LAN are coupled via WAN 400. Communication protocols that can be used for LAN include Ethernet (registered trademark) and TCP/IP for example.

Host 200 will now be described.

Host 200 is any kind of computer employed by the user (for example a PC, server, or mainframe computer). Host 200 is operated by a variety of programs stored in the memory and read into the CPU. The application program performs read and write access to the logical volumes provided by storage 100.

A client apparatus (PC, server or the like) is coupled to host 200 via LAN or the like (not shown in the diagram). A client apparatus can use the services provided by the application program by communicating with the application program provided by host 200.

Storage 100 will now be described with reference to FIG. 2.

Storage 100 is an apparatus for storing data (user data) used by the application program on host 200. In what follows, the configuration of the hardware of storage 100 in Embodiment 1 and the management and processing of data in storage 100 will be described. The description will begin with the configuration of the hardware of storage 100.

Figure 2:
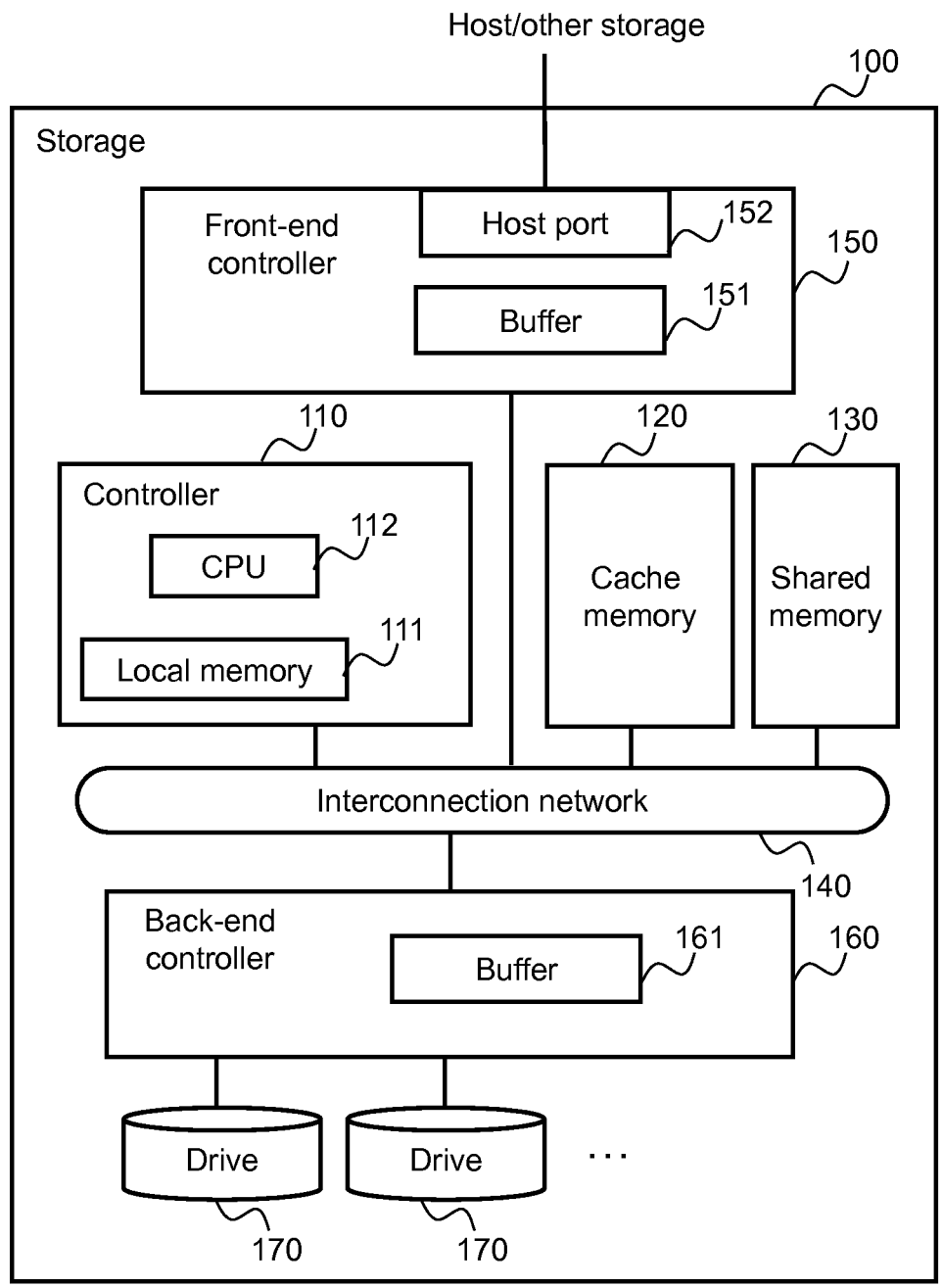
FIG. 2 is a diagram illustrating a configuration of the storage hardware in Embodiment 1 and Embodiment 2.

According to FIG. 2, storage 100 comprises controller 110, cache memory 120, shared memory 130, interconnection network 140, front-end controller 150, back-end controller 160, and drive 170.

Cache memory 120 is a storage area used for temporarily storing data received from host 200 or another storage, or temporarily storing data read from drive 170. Cache memory 120 can be configured as a volatile memory such as a DRAM or SRAM, or a non-volatile memory such as a NAND flash memory, MRAM (Magnetoresistive Random Access Memory), ReRAM (Resistance Random Access Memory), or PCM (Phase Change Memory).

A duplicate configuration (or more redundant configuration) can be given to cache memory 120 to prevent any of the data received from host 200 or another storage not yet reflected in drive 170 from being lost should any damage occur to the hardware of cache memory 120. Moreover, cache memory 120 can be configured using RAID or similar technology with the purpose of improving performance, high scalability, or high availability.

Shared memory 130 is a storage area for storing management information relating to all types of data processing within storage 100. The shared memory, in the same way as for cache memory 120, can be configured using a variety of volatile memories and non-volatile memories. The hardware for shared memory 130 can use the hardware for cache memory 120, or can have hardware which is not shared. Moreover, in the same way as for cache memory 120, shared memory 130 can be given a duplicate configuration (or more redundant configuration).

Controller 110 is a component which carries out the processing of various kinds of data within storage 100, such as storing data received from host 200 or another storage in cache memory 120, the writing of data stored in cache memory 120 into drive 170, the reading of data stored in drive 170 into cache memory 120, and the transmission of data in cache memory 120 to host 200 or another storage. Controller 110 comprises an internal bus and an internal port (not illustrated) in addition to local memory 111 and CPU 112. Local memory 111 can be configured using a variety of volatile memories and non-volatile memories in the same way as for cache memory 120.

The internal ports of local memory 111, CPU 112, and controller 110 are coupled together via the internal bus of controller 110. Controller 110 is coupled to mutual connection network 140 via the internal port of controller 110.

Drive 170 is a storage area for storing data used by the application program on host 200. Drive 170 can be configured using a magnetic disk apparatus such as an HDD (Hard Disk Drive), or a semiconductor disk apparatus such as an SSD (Solid State Drive). Drive 170 may be a commercially available drive which only processes read and write requests (referred to as a "general-purpose drive"), or may be a drive with a special controller enabled to calculate the XOR (exclusive logical sum) for data within a drive (a drive with XOR execution function), to be described later. For the semiconductor disk apparatus storage medium a non-volatile memory such as a NAND flash memory, MRAM, ReRAM, and PCM can be used.

Front-end controller 150 is a component which relays control information and data received and transmitted between host 200 and another storage, and cache memory 120 and the controller.

Buffer 151 is a storage area for temporarily storing control information and data relayed by front-end controller 150. Buffer 151 may be configured using various volatile memories and non-volatile memories in the same way as for cache memory 120. The internal bus of front-end controller 150 is mutually coupled to the various components of front-end controller 150. Front-end controller 150 is coupled to host 200 or another storage via host port 152, and is also coupled to interconnection network 140 via the internal port of front-end controller 150.

Back-end controller 160 is a component which carries out the relaying of control information or data sent and received between drive 170 and controller 110 or cache memory 120. Back-end controller 160 can comprise a CPU, an internal bus and internal port not shown in the diagram in addition to buffer 161. Buffer 161 is a storage area for temporarily storing control information or data relayed by back-end controller 160. Buffer 161 can be configured using a variety of volatile memories and non-volatile memories in the same way as cache memory 120. The internal bus of back-end controller 160 is mutually coupled to all the components within back-end controller 160. Back-end controller 160 is coupled to interconnection network 140 and drive 170 via the internal port of back-end controller 160.

It should be noted that controller 110, front-end controller 150, back-end controller 160 and interconnection network 140 can be given a duplicate configuration (or more redundant configuration), with the purpose of ensuring higher performance, higher scalability and high availability.

An overall description of a subblock, RAID group, virtual device, logical volume, LBA, data guarantee code, cache segment, cache slot, cache directory, parity generation process, storage process, destaging process and read process will now be given as basic concepts relating to data management and data-processing in storage 100.

The subblock is the minimum unit for host 200 to read/write data to storage 100, or controller 110 to read/write data to drive 170.

The RAID group is a group of drives 170 based on RAID technology. This embodiment presumes RAID 5 as the RAID level.

The virtual device is a virtual device comprising the memory areas of drive 170 within the RAID group. User data and parity data (redundant data) are included within the virtual device.

The logical volume (also alternatively referred to simply as a volume) is a logical storage area comprising a collection of subblocks in which user data is stored within partial areas of the virtual device. A logical volume is supplied to the application program on host 200. One virtual device is made to correspond to the logical volume. At the same time, one or a plurality of logical volumes can be made to correspond to a virtual device.

The LBA (Logical Block Address) is positioning information for configuring the subblock within the logical volume or drive. For example, subblocks within a logical volume for which the LBA is "0" or "1" correspond respectively to the first and second subblocks within the logical volume.

The data guarantee code (hereinafter "guarantee code") is information which allows CPU 112 (or the CPU of front-end controller 150, or the CPU of back-end controller 160) to detect that damage has occurred to write data due to some kind of hardware or software abnormality from when write data is received by storage 100 from host 200 and this write data is written to drive 170 until this write data is subsequently read from host 200 (in other words, an error detection code). As data guarantee codes, a data guarantee code can be configured so as to be attached to every subblock, including for example the LRC (horizontal redundancy check) value or the CRC (cyclic redundancy check) value of the current subblock, or additionally all or part of the positional information (logical volume number and LBA group) for the current subblock.

The cache segment is a basic processing unit for managing the storage areas of the physical cache memory. It should be noted that depending on the storage data the cache segment is divided into two parts, (1) a write cache segment, and (2) a read cache segment. (1) In the write cache segment, write data and parity data to which the parity generation process is unexecuted are stored. (2) In the read cache segment, write data and parity data of which the parity generation process completed, or user data and parity data read from drive 170 are stored. In the description that follows, unless it is necessary, (1) and (2) will be referred to simply as a cache segment without making a particular distinction.

The cache slot, in addition to being a data structure for managing the related cache segment group, is the basic processing unit when the parity generation process and the destaging process to be described later is carried out. The state of the cache slot is stored in the cache slot. Depending on the state of the cache slot, CPU 112 manages it according to (1) whether the cache slot is either "in use" or "not in use (free)", (2) whether the data being managed by the cache slot (current data) is dirty data (write data or parity data not reflected in drive 170) or clean data (write data or parity data reflected in drive 170, or user data or parity data read from drive 170), (3) where the current data is dirty data, whether the parity generation process relating to the current data is either "incomplete" or "complete", and so on.

The cache directory is a data structure for finding the cache slot corresponding to position information from the data positioning information (combination of virtual device identifier and LBA). The cache directory may be configured to use a hash table for example, which stores a plurality of keys and value groups and is a data structure allowing instant reference to a value corresponding to a key. In this case, the "key" is combination of virtual device identifier and LBA, and the "value" the identifier for the cache slot.

The parity generation process is a process which uses new data which is write data from the host, and the like to generate a new parity which is parity data corresponding to this new data. As a method of generating parity data in RAID 5, two methods (1) "the full stripe writing method (Full-Stripe-Write)" and (2) "read/modify/write method (Read-Modify-Write)" are generally known. As the action of these two methods is known to the art, its description will be omitted.

The staging process is a process in which storage 100 reads data (user data or parity data) from drive 170 to the cache segment. It should be noted that in the staging process the storage 100 needs to acquire a cache segment if needed. Moreover, where the target data is in a cache memory, storage 100 does not need to perform a staging process.

The destaging process is a process where, after parity generation, storage 100 writes the new data and new parity stored in the cache segment into drive 170.

The read process will now be described. With the read process, storage 100 performs a staging process on the target data in accordance with a read request from host 200, and transmits the target data to host 200.

Returning again to FIG. 1, the description of computer system 1 will now be continued.

Host 200L, main storage 100L and WAN optimizer apparatus 300L are referred to collectively as the main system, with host 200R, subsidiary storage 100R and WAN optimizer apparatus 300R being referred to collectively as the subsidiary system. In normal operation, all types of business operation are carried out using the main system.

Main storage 100L is provided with cache memory 120L, master volume 10L and primary journal volume 20L as the main storage data areas. Moreover, subsidiary storage 100R is provided with cache memory 120R, duplicate volume 10R, and secondary journal volume 20R as the main data storage areas. Master volume 10L is a logical volume in which the data for the application program on host 200L is stored. Duplicate volume 10R is a logical volume in which a copy of main volume 10L is stored. Primary journal volume 20L and secondary journal volume 20R are logical volumes for temporarily storing data transferred during an asynchronous remote copy.

Data in the master volume 10L in main storage 100L is duplicated in duplicate volume 10R within subsidiary storage 100R using a remote copy function. Where there is any kind of damage to the main system, the subsidiary system continues executing the various business processes.

WAN optimizer apparatus 300L, 300R will be described here. WAN optimizer apparatus 300L, 300R is an apparatus for reducing the amount of data transferred via WAN from the main system to the subsidiary system.

WAN optimizer apparatus 300L compresses the data transferred to the subsidiary system from the main system using a remote copy function, and transfers it to WAN optimizer apparatus 300R. WAN optimizer apparatus 300R which receives the compressed transfer data, decompresses the received transfer data and transfers it to subsidiary storage 100R.

It should be noted that in this embodiment, data compression is described as being carried out by WAN optimizer apparatus 300L, with data being decompressed by WAN optimizer apparatus 300R as an example, but it may be configured such that data compression is carried out by main storage 100L, with data decompression carried out by subsidiary storage 100R. However, in this case it is necessary for storage 100 to be provided with a data compression/decompression function.

Moreover, in the description given above of compression/decompression, no mention was made of the compression/decompression algorithm, but the compression/decompression algorithm may employ various lossless compression algorithms (such as compression algorithms which employ universal encoding and entropy encoding).

Figure 3:
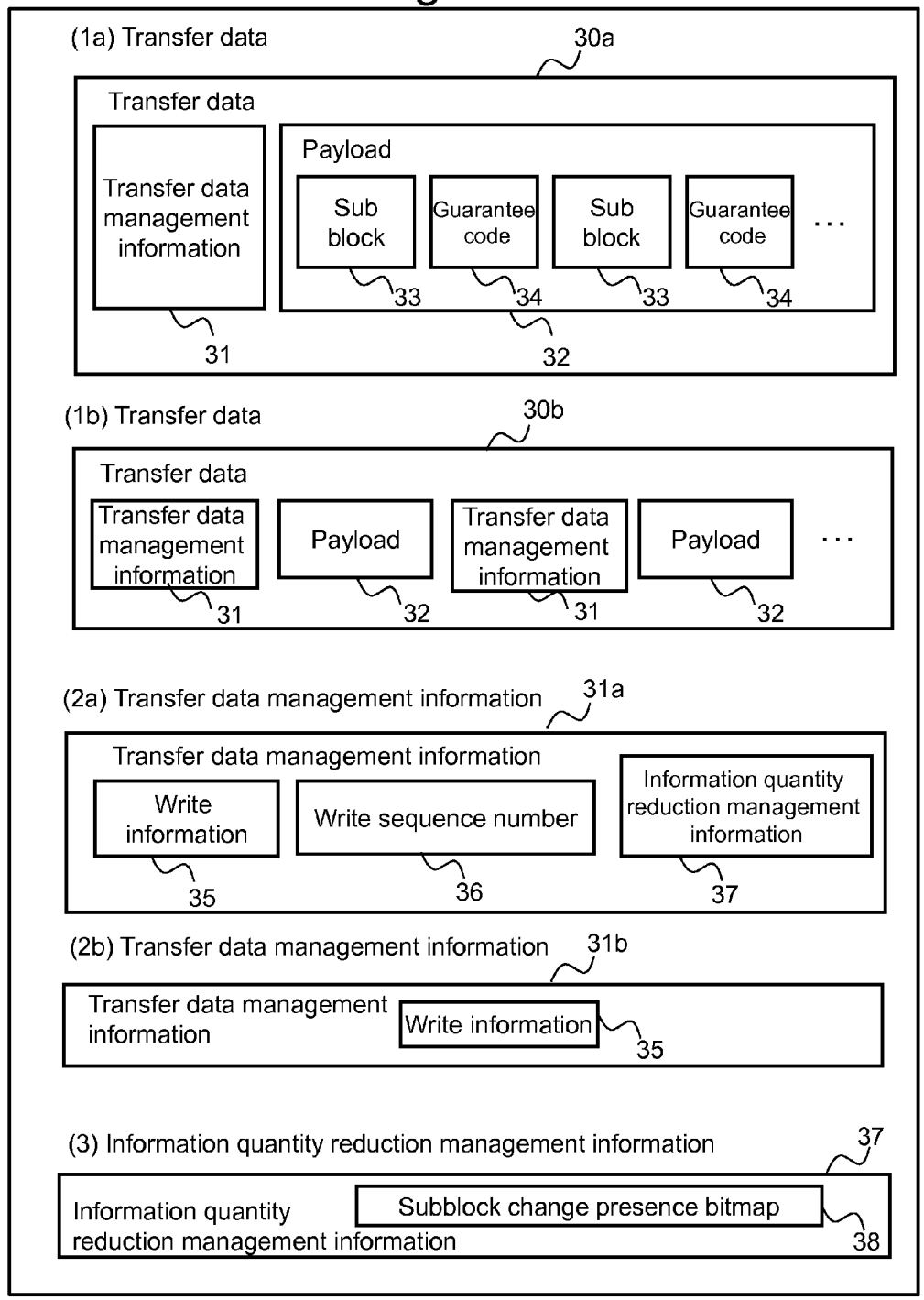
FIG. 3 is a diagram illustrating a configuration of the structure of data transferred in Embodiment 1 and Embodiment 2.

FIG. 3 is a diagram illustrating the data configurations for transfer data 30 which is data transferred to subsidiary storage 100R from main storage 100L. Transfer data 30 contains a copy of the write data written into main storage 100L. In what follows, to distinguish it from the write data transmitted from host 200, the copy of the write data contained in transfer data 30 will be referred to as the current write data.

Transfer data 30 is stored in a cache segment, or within primary journal volume 20L or secondary journal volume 20R (including within cache segments associated with primary journal volume 20L and secondary journal volume 20R).

Transfer data 30 comprises transfer data management information 31 and payload 32. Transfer data 30 can be configured to include just one pair of transfer data management information 31 and payload 32 as shown for transfer data 30a in (1a), or configured to include a plurality of pairs of payload 32 and transfer data management information 31 as shown in data transfer 30b in (1b). Payload 32 comprises the current write data stored in subblock 33 and guarantee code 34 corresponding to the data stored in subblock 33. Payload 32 may contain one or a plurality of pairs of guarantee code 34 and data stored in subblock 33.

Transfer data management information 31 can have a structure comprising transfer data management 31a (see (2a)) or transfer data management information 31b (see (2b)).

Transfer data management information 31a (see (2a)) comprises write information 35, write sequence number 36 and information quantity reduction management information 37. Write information 35 comprises the logical volume number for master volume 10L in which the current data is written, the LBA within master volume 10L in which current write data is written, and the size of the current write data. Subsidiary storage 100R can specify from this write data 35 (or information from remote copy management table 1600 to be described later) which LBA or which duplicate volume the new data (write data) replicated on the basis of the transfer data should be stored in. Write information 35 is a copy of the write information contained in transfer data management table 1500 to be described later. Write sequence number 36 is a write sequence number assigned to the current write data. The write sequence number is information for controlling the writing sequence for the write data to duplicate volume 10R in an asynchronous remote copying process.

Transfer data management information 31b (see (2a)) differs from transfer data management information 31a in that it does not contain write sequence number 36 and information quantity reduction management information 37. Transfer data management information 31b does not use write sequence number 36, and can be used where an information quantity reduction process is not carried out as described later.

Information quantity reduction management information 37 comprises subblock change presence bitmap 38. Subblock change presence bitmap 38 is a copy of subblock change presence bitmap 1503 contained in transfer data management table 1500 to be described later. The role of subblock change presence bitmap 38 will be described later.

Figure 26:
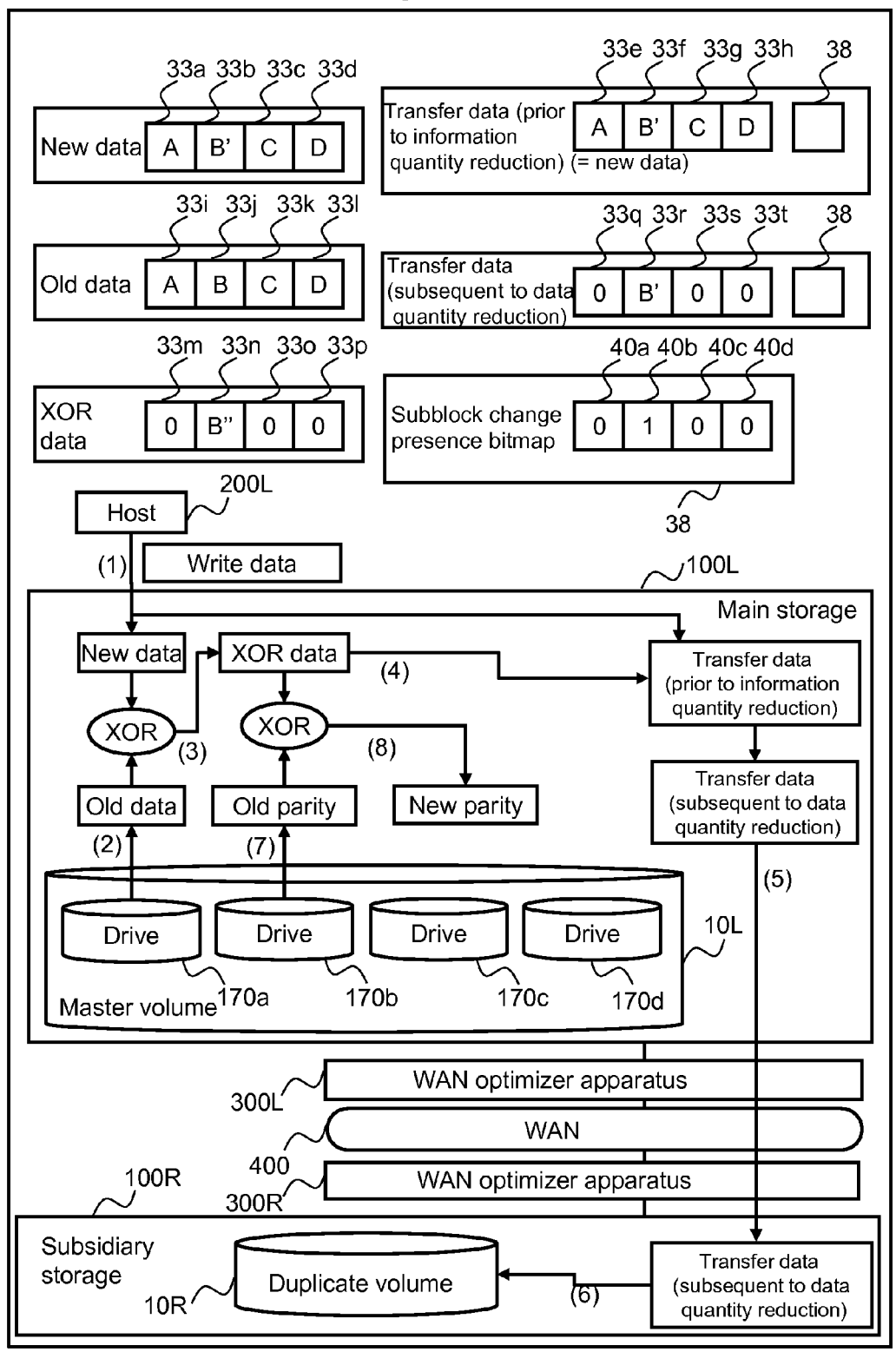
FIG. 26 is a schematic diagram for the whole of Embodiment 1 and Embodiment 2.

FIG. 26 is a schematic diagram showing the whole of Embodiment 1 (and Embodiment 2).

The diagram illustrates the action of one process explained in the flow chart to be described later. Specifically, the diagram illustrates the action with which transfer data containing write data (or data generated using write data or the like) is transferred to subsidiary storage 100R after the write data sent from host 200L has been written to main storage 100L, and the write data contained in the transfer data (or write data generated from data generated using write data contained in the transfer data) is written into duplicate volume 10R.

Drives 170a to 170d in the diagram comprise a single RAID group, with master volume 10L being configured from part of the storage area contained in this RAID group. Data compression/decompression of the transfer data is carried out as described for WAN optimizer apparatuses 300L, 300R.

The new data is write data written into an area (LBA) within master volume 10L. Moreover, the old data is data one set older than data corresponding to the new data (the LBA in which new data is written) (however, the old data is not limited to data read from drive 170a). Moreover, the old parity is parity corresponding to the old data. The new parity is parity data corresponding to the new data. It should be noted that old data and new data both have attached guarantee codes (and so forth hereinafter).

In the diagram, the quantity of information is reduced for transfer data (prior to information quantity reduction) based on the XOR data information obtained from the new data and the old data, and transfer data (subsequent to information quantity reduction) is shown being transferred to subsidiary storage 100R. Moreover as the quantity of data for the transfer data (subsequent to information quantity reduction) is reduced at WAN optimizer apparatus 300L once compression has been applied to the transfer data (subsequent to information quantity reduction), it illustrates that it is possible to reduce the quantity of data transferred via WAN 400.

A practical example of the action of the process will now be described for the same diagram.

The sequence of patterns relating to the timing of the execution of the various processes in FIG. 26 will be explained later in respect of FIG. 27, but it is possible for example to execute (2) to (8) in FIG. 26 synchronously with the reception of new data (1) in the diagram, or asynchronously with the reception of new data (1) in the diagram.

Moreover, it is also possible for example to execute (2) to (4) in the diagram synchronously with reception of new data, and also to execute (5) to (8) in the diagram asynchronously with the reception of new data. Furthermore, (4) in the diagram may for example be executed after executing (2), (3), (7) and (8) in the diagram, or (7) and (8) executed after executing (2), (3), and (4) in the diagram.

Steps (1) to (8) in the diagram will now be explained in turn.

At (1) in the diagram, write data is transmitted from host 200L to main storage 100L. At (1), in addition to being copied as transfer data (prior to information quantity reduction) to cache memory 120L, write data is stored as new data in cache memory 120L.

As an example, the new data contains four subblocks 33a to 33d, and the transfer data (prior to information quantity reduction) stored in cache memory 120L contains four subblocks 33e to 33h. In this example, data "A" "B" "C" and "D" is respectively contained in subblocks 33a to 33d as write data, and the same data "A" "B" "C" and "D" is stored respectively in subblocks 33e to 33h as copies of the write data. It should be noted that for illustration purposes in the diagram the data managed at the subblock unit is described as "A" and the like, but in practice the data managed at the subblock unit is comprised of byte strings.

At (2) in the diagram, the old data is read from drive 170a. It should be noted that where the old data is in cache memory 120L, there is no need to read the old data from drive 170a. Moreover, there will be cases where the old data is not present in drive 170a (having not yet been destaged to drive 170a), and is only present in cache memory 120L.

As an example, the old data contains four subblocks 33i to 33l. Subblocks 33i to 33l will for example respectively hold data "A" "B" "C" and "D". A comparison of the new data and the old data shows that only data in the position of the old data subblock 33j (data in the position of new data subblock 33b) is different.

At (3) in the diagram, XOR data is generated by performing an XOR calculation on the new data stored in cache memory 120L and the old data stored in cache memory 120L, or the old data read from drive 170a.

As an example, XOR data contains four subblocks 33m to 33p. Data "0" "B'" "0" "0" is stored respectively in subblocks 33m to 33p. Here data "0" expresses data stored in subblocks comprised only of "0" bit values. Given that the XOR for two bits with matching bit values has a bit value of "0", it is clear for example that the content of the data in new data subblock 33*a* and the content of the data in subblock 33*i* corresponding to the old data match completely, so the data in subblock 33*m* corresponding to the XOR data will be "0". The data in subblocks 33*o* and 33*p* are both "0" for the same reason.

At the same time, the content of the data of subblock 33*b* in the new data and the content of the data of subblock 33*j* corresponding to the old data do not match, so the data for subblock 33*n* corresponding to the XOR data is not "0" but is for example "B'"".

The information quantity reduction process takes place at (4) in the diagram. With the information quantity reduction process, transfer data with a reduced quantity of information (subsequent to information quantity reduction) is generated from the transfer data (prior to information quantity reduction) copied into cache memory 120L. Here main storage 100L detects subblocks with data "0" from the XOR data subblocks for example, and generates transfer data (subsequent to information quantity reduction) by substituting data in subblocks of the transfer data (prior to information quantity reduction) corresponding to subblocks holding data "0" with data "0" (or by comparing the new data with the old data, and substituting "0" for data in subblocks in which there is no change).

The transfer data (subsequent to information quantity reduction) is where the results of the information quantity reduction process are obtained. As the quantity of information in data "0" is small, the quantity of information in transfer data containing a large number of data "0" (subsequent to information quantity reduction) is reduced compared to transfer data (prior to information quantity reduction). Subblock change presence bitmap 38 is a bitmap contained in transfer data, and in the example shown in the diagram contains four bits 40 (40*a* to 40*d*), with bits 40*a* to 40*d* corresponding respectively to subblocks 33*q* to 33*t*.

The specific process for the information quantity reduction process will now be described. In the information quantity reduction process, the following processes (A) and (B) are mainly performed by CPU 112.

(A) In the information quantity reduction process, a process of configuration is first executed for the subblock change presence bitmap 38. Where there is a change between a corresponding subblock in the old data and a corresponding subblock in the new data, bit 40 of subblock change presence bitmap 38 is configured to "1" (change), and where there is not, is configured to "0" (no change). It should be noted that the initial value of bit 40 of subblock change presence bitmap 38 may be set for example to "1" (change).

(B) The next stage of the information quantity reduction process is that transfer data for which the information quantity has been reduced (subsequent to information quantity reduction) is generated from transfer data (prior to information quantity reduction) based on the subblock change presence bitmap 38 generated in (A). Specifically, CPU 112 substitutes data in subblocks of the transfer data (prior to information quantity reduction) corresponding to bits for which the value of the bit in subblock change presence bitmap 38 in the cache memory is "0" (no change) with data "0", and for data in other subblocks uses the same data as the new data, without substituting data "0". As a result of this process, the data string "0" "B'" "0" "0" is obtained as the transfer data (subsequent to information quantity reduction).

It should be noted that it is possible to use a method other than the one described above as a method for the CPU 112 to configure subblock change presence bitmap 38 in the information quantity reduction process in (A). For example, a guarantee code may be assigned respectively to the new data and old data subblock 33. Where the value of the guarantee code for the new data subblock and the value of the guarantee code for the corresponding old data subblock do not match, this invariably means that the content of the data of this subblock in the new data and the content of the subblock corresponding to the old data do not match. As a result CPU 112 can configure the bit 40 corresponding to the subblock change presence bitmap 38 to "1" (change) before reading out the subblock for the XOR data, simply by comparing the value of the guarantee code for the subblock in the new data and the value for the guarantee code of the subblock in the old data.

Where the guarantee codes match, the data within the subblock of this XOR data is read to CPU 112, where a determination is made as to whether the data matches data "0", and where the data matches data "0", bit 40 is configured to "0" (no change), and where the data does not match data "0", bit 40 must be configured to "1" (change). This is because even though the guarantee codes may match, it cannot be said that there has been no change to the data within the corresponding subblock. Nonetheless, for data in subblocks whose guarantee codes do not match, there is no need to read data to CPU 112 to determine a match with "0", and thus the number of processes for the CPU 112 can be reduced.

Moreover, in configuring the subblock change presence bitmap 38, CPU 112 may for example use the new data and the old data or some other method, and not use XOR, but these methods will be described later.

Furthermore with the data information reduction process, there are three formats based on the configured subblock change presence bitmap 38 (formats controlled by information quantity reduction process classifier 1706 in system information management table 1700 to be described later) with which CPU 112 can process the generation of transfer data (subsequent to information quantity reduction), namely "0 fill", "discard", and "XOR data".

One of the formats, "0 fill", is a format whereby CPU 112 refers to subblock change presence bitmap 38 and substitutes data in subblocks which have not changed between the new data and the old data in the subblocks of the transfer data (prior to information quantity reduction) with data "0" as described previously.

Another of the formats, "discard", is a format whereby CPU 112 refers to subblock change presence bitmap 38 and generates transfer data (subsequent to information quantity reduction) using only subblocks for which there is a change between the new data and the old data of the subblocks of the transfer data (prior to information quantity reduction). Subblocks for which there is no change between the new data and the old data in subblocks of the data transfer (prior to information quantity reduction) are "discarded".

Another of the formats, "XOR data", indicates a format which generates transfer data (subsequent to information quantity reduction) with CPU 112 using the XOR data itself.

A specific description of these various formats will be given later. The advantages of the "0 fill" and "discard" formats will also be described later (see descriptions of FIG. 20, FIG. 23). Moreover, the advantage of the "XOR data" format is that in comparison to the "0 fill" and "discard" format, it is possible to further reduce the quantity of information in the transfer data (subsequent to information quantity reduction), and reduce the quantity of data for the compressed transfer data (subsequent to information quantity reduction).

At (5) in the diagram, the transfer data (subsequent to information quantity reduction) is transferred to subsidiary storage 100R. It should be noted that depending on the situation the transfer data may be transferred prior to executing (4) in the same diagram, but in this case the transfer data (prior to information quantity reduction) is transferred to subsidiary storage 100R, not the transfer data (subsequent to information quantity reduction).

At (6) in the diagram, the content of the write data (or XOR data) in the transfer data (subsequent to information quantity reduction) is reflected in duplicate volume 10R. Specifically, only subblocks in the transfer data (subsequent to information quantity reduction) corresponding to bits where the value of bit 40 of subblock change presence bitmap 38 is "1" (subblocks within the transfer data (subsequent to information quantity reduction) corresponding to subblocks for which there is a change between the old data and the new data) are written to duplicate volume 10R. It should be noted that where the subblocks in the transfer data (subsequent to information quantity reduction) are XOR data, the new data is generated by calculating the XOR for the old data stored in duplicate volume 10R and this XOR data, and the generated new data is written to duplicate volume 10R.

At (7) in the diagram, the old parity is read from drive 170b by CPU 112. It should be noted that where the old parity is in cache memory 120L, there is no need for CPU 112 to read the old parity from drive 170b. Moreover, there will be cases where the old parity only exists on cache memory 120L.

At (8) in the diagram, CPU 112 generates the new parity by calculating the XOR for the old parity and the XOR data. That the XOR for the old parity and the XOR data is identical to the new parity will be clear from the fact that the new parity is generated by calculating the XOR for the new data, old data, and old parity.

The main effect of the processing action illustrated in the schematic diagram of the whole embodiment will now be described.

In the embodiment, the quantity of information (entropy) in the transfer data transferred to subsidiary storage 100R from main storage 100L is reduced, and as compression/decompression is carried out by WAN optimizer apparatuses 300L, 300R on transfer data for which the quantity of information has been reduced, the quantity of data being transferred via WAN can be reduced.

Where using XOR data for the information quantity reduction process, the XOR data can be used for the dual purpose of information quantity reduction process and parity generation, with the advantage that (1) in some cases there will be no need for CPU 112 to generate separate XOR data when generating parity, enabling the burden of the processing load on CPU 112 to be lightened, (2) in some cases there will be no need for CPU 112 to separately read old data from the drive when generating parity, so that the load on drive 170 can be reduced, and so on.

Moreover, in the configuration process for subblock change presence bitmap 38, it is possible to compare the guarantee codes for the new data subblocks with the guarantee codes for the subblocks corresponding to the old data, enabling the number of subblocks of XOR data for which CPU 112 must compare the new data read by CPU 112 with data "0" to be reduced, allowing the processing burden on controller 110 of main storage 100L to be reduced.

That completes the description of the whole embodiment and the effects of the embodiment.

Figure 27:
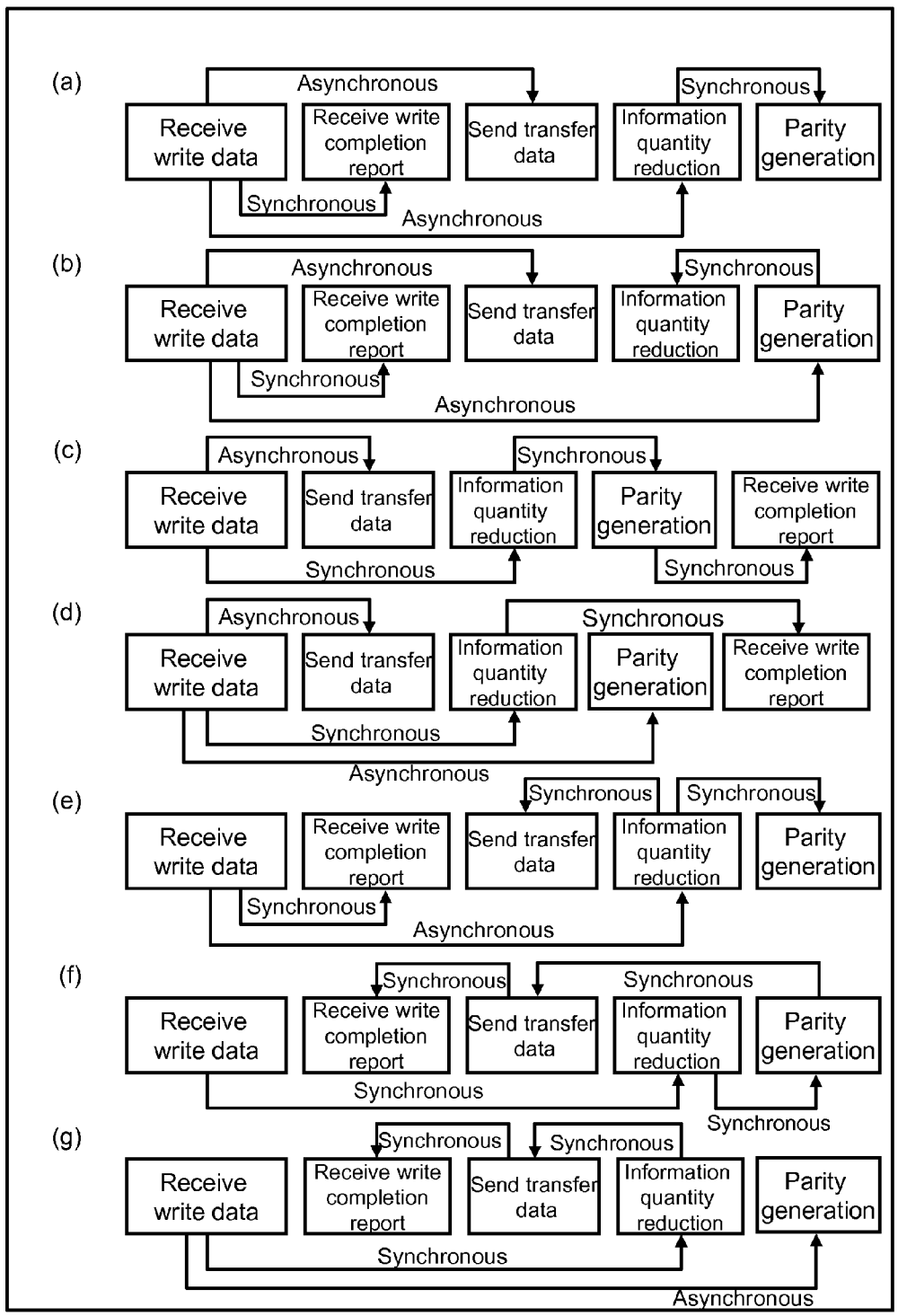
FIG. 27 is a diagram showing examples of patterns for timing the execution of each of the processes in FIG. 26.

FIG. 27 is a diagram illustrating examples of patterns for the timing of the execution of the various types of process as shown in FIG. 26.

FIG. 27 contains both the patterns described for Embodiment 1 and the patterns illustrating Embodiment 2 to be described later. The "write data reception" in FIG. 27 corresponds to (1) in FIG. 26. Moreover, the "transfer of transfer data" in FIG. 27 corresponds to (5) in FIG. 26. Furthermore, the "transmission of a write completion report" in FIG. 27, though not shown in FIG. 26, indicates the transmission of a write completion report to host 200L from main storage 100L. Again, the "information quantity reduction process" and "parity generation process" in FIG. 27 will be described later.

Patterns (a) to (e) in FIG. 27 are patterns corresponding to Embodiment 1.

In (a) in FIG. 27, CPU 112 carries out the "transfer of transfer data" and the "information quantity reduction process" asynchronously with the "write data reception", issuing a "write completion report transmission" synchronously with "write data reception", and carrying out the "parity generation process" synchronously with the "information quantity reduction process". The "information quantity reduction process" in FIG. 27(a), corresponds to steps (2) to (4) in FIG. 26, and the "parity generation process" in FIG. 27 (a) corresponds to steps (7) and (8) in FIG. 26.

In (b) in FIG. 27, CPU 112 carries out the "transfer of transfer data" and the "parity generation process" asynchronously with the "write data reception", carrying out the "transmission of write completion report" synchronously with the "write data reception", and the "information quantity reduction process" synchronously with the "parity generation process". The "parity generation process" of FIG. 27(b) corresponds to steps (2), (3), (7) and (8) in FIG. 26, and the "information quantity reduction process" of FIG. 27 (b) corresponds to step (4) in FIG. 26.

In (c) in FIG. 27, CPU 112 carries out the "transfer of transfer data" asynchronously with the "write data reception", and carries out the "information quantity reduction process" synchronously with the "write data reception", carrying out the "parity generation process" synchronously with the "information quantity reduction process", with the "write completion report transmission" being carried out synchronously with the "parity generation process". The "information quantity reduction process" of FIG. 27(c) corresponds to steps (2), (3) and (4) FIG. 26, with the "parity generation process" of FIG. 27(c) corresponding to steps (7) and (8) of FIG. 26. It should be noted that it can be arranged to carry out the "parity generation" before the "information quantity reduction process". In this case, the "parity generation" corresponds to steps (2), (3), (7), and (8) of FIG. 26, and the "information quantity reduction process" corresponds to step (4) in FIG. 26.

In (d) in FIG. 27, CPU 112 carries out the "transfer of data transfer" asynchronously with the "write data reception", and carries out the "information quantity reduction process" synchronously with the "write data reception", carrying out the "write completion report transmission" synchronously with the "parity generation process", with the "parity generation" carried out asynchronously with the "write data reception". The "information quantity reduction process" of FIG. 27 (d) corresponds to steps (2), (3) and (4) FIG. 26.

In FIG. 27(e), CPU 112 carries out the "information quantity reduction process" asynchronously with the "write data reception", and carries out the "transfer of transfer data" and the "parity generation process" synchronously with the "information quantity reduction process", with the "write completion report transmission" being carried out synchronously with the "write data reception". The "information quantity reduction process" of FIG. 27(e) corresponds to steps (2), (3) and (4) of FIG. 26, with the "parity generation process" of FIG. 27 (e) corresponding to (7) and (8) of FIG. 26. It should be noted that it can be arranged to carry out the "parity generation" before the "information quantity reduction process". In this case, the "parity generation" corresponds to steps (2), (3), (7), and (8) of FIG. 26, and the "information quantity reduction process" corresponds to step (4) in FIG. 26.

The patterns (a) to (e) in FIG. 27 are patterns representing the action of asynchronous remote copying, with CPU 112 carrying out the "transfer of transfer data" asynchronously with the "write data reception", and the "transmission of write completion report" being carried out before the "transfer of transfer data". With CPU 112 carrying out the "transfer of transfer data" asynchronously with the "write data reception" in this way, it is possible to shorten the write response time (the interval from the time the host transmits a write command to the storage to when the write completion report is received from the storage).

The patterns of (a), (b) and (e) in FIG. 27 are patterns where CPU 112 carries out the "information process reduction process" (and the "parity generation process") asynchronously with the "write data reception". With CPU 112 carrying out the "information process reduction process" (and the "parity generation process") asynchronously with the "write data reception" in this way, it is possible to ensure that the processing time for the "information quantity reduction process" (and the "parity generation process") does not affect the write response time.

Patterns (c) and (d) in FIG. 27 are patterns where CPU 112 carries out the "information quantity reduction process" synchronously with the "write data reception". With CPU 112 carrying out the "information quantity reduction process" asynchronously with the "write data reception" in this way, it is possible to reliably carry out the "information quantity reduction process" prior to the "transfer of transfer data".

Pattern (e) in FIG. 27 is a pattern where CPU 112 carries out the "transfer of transfer data" synchronously subsequent to the "information quantity reduction process". With CPU 112 carrying out the "transfer of transfer data" synchronously subsequent to the "information quantity reduction process" in this way, it is possible to reliably carry out the "information quantity reduction process" before the "transfer of transfer data".

Patterns (a), (c) and (e) of FIG. 27 are patterns where CPU 112 carries out the "parity generation process" synchronously with the "information quantity reduction process". With CPU 112 carrying out the "parity generation process" synchronously with the "information quantity reduction process" in this way, after generating XOR data at the "information quantity reduction process", it is possible to use the generated XOR data in the "parity generation process", enabling a reduction in the read processing burden for the old data when generating XOR data and the XOR data generating process burden for the new data and old data. It should be noted that where the "parity generation process" is carried out synchronously with the "information quantity reduction process", it is possible to use the generated XOR data in the "information quantity reduction process" after generating the XOR data at the "parity generation process", enabling the same effect to be obtained.

Pattern (b) of FIG. 27 is a pattern where CPU 112 carries out the "information quantity reduction process" synchronously with the "parity generation process". With CPU 112 carrying out the "information quantity reduction process" synchronously with the "parity generation process" in this way, the XOR data generated in the "parity generation process" can be used in the "information quantity reduction process", and it is possible to reduce the read processing burden for old data in generating the XOR data, and the burden in the process of generating XOR data from new data and old data.

It should be noted that in (c) and (d) in FIG. 27, where the old data is in the cache memory (for example where a cache resident process is applied to the old data), CPU 112 does not need to read old data from the drive, enabling a further reduction in the influence on write response time.

Patterns in (f) and (g) of FIG. 27 are patterns corresponding to patterns in Embodiment 2.

In (f) of FIG. 27, CPU 112 carries out the "information quantity reduction process" synchronously with the "write data reception", and carries out the "parity generation process" synchronously with the "information quantity reduction process", carrying out the "transfer data transfer" synchronously with the "parity generation process", and carrying out the "transmission of write completion report" synchronously with the "transfer of transfer data". The "information quantity reduction process" of FIG. 27 (f) corresponds to steps (2), (3) and (4) of FIG. 26, and the "parity generation process" of FIG. 27(f) corresponds to steps (7) and (8) in FIG. 26. It should be noted that it is possible to arrange for the "parity generation" to be carried out before the "information quantity reduction process". In this case, the "parity generation" corresponds to steps (2), (3) (7) and (8) of FIG. 26, and the "information quantity reduction process" corresponds to step (4) of FIG. 26.

With (g) of FIG. 27, CPU 112 carries out the "information quantity reduction process" synchronously with the "write data reception", and carries out the "transfer of transfer data" synchronously with the "information quantity reduction process", carrying out "write data reception" synchronously with "transfer of transfer data", and "parity generation" asynchronously with "write data reception". The "information quantity reduction process" of FIG. 27(g) corresponds to steps (2), (3) and (4) in FIG. 26.

Patterns (f) and (g) of FIG. 27 are patterns illustrating a synchronous remote copying process where CPU 112 carries out the "transfer of transfer data" synchronously with the "write data reception", and subsequently carries out the "write completion report transmission" synchronously with the "transfer of transfer data". With CPU 112 carrying out the "transfer of transfer data" before the "transmission of write completion report" synchronously with the "write data reception", it is possible to ensure that there is no loss of write data from the host even where some kind of damage occurs to main storage 100L. Moreover, in patterns (f) and (g) of FIG. 27, CPU 112 carries out the "information quantity reduction process" synchronously with the "write data reception", which enables the "information quantity reduction process" to be reliably carried out.

In the same way as for patterns (a), (c) and (e), pattern (f) in FIG. 27 is a pattern where the "parity generation process" is carried out synchronously with the "information quantity reduction process", producing the same results as for (a), (c) and (e).

It should be noted that with (f) and (g) in FIG. 27, where the old data is in the cache memory, (for example where a "cache resident process" to be described later has been applied to the old data), CPU 112 has no need to read old data from the drive, enabling a reduction in the influence on write response time.

Figure 25:
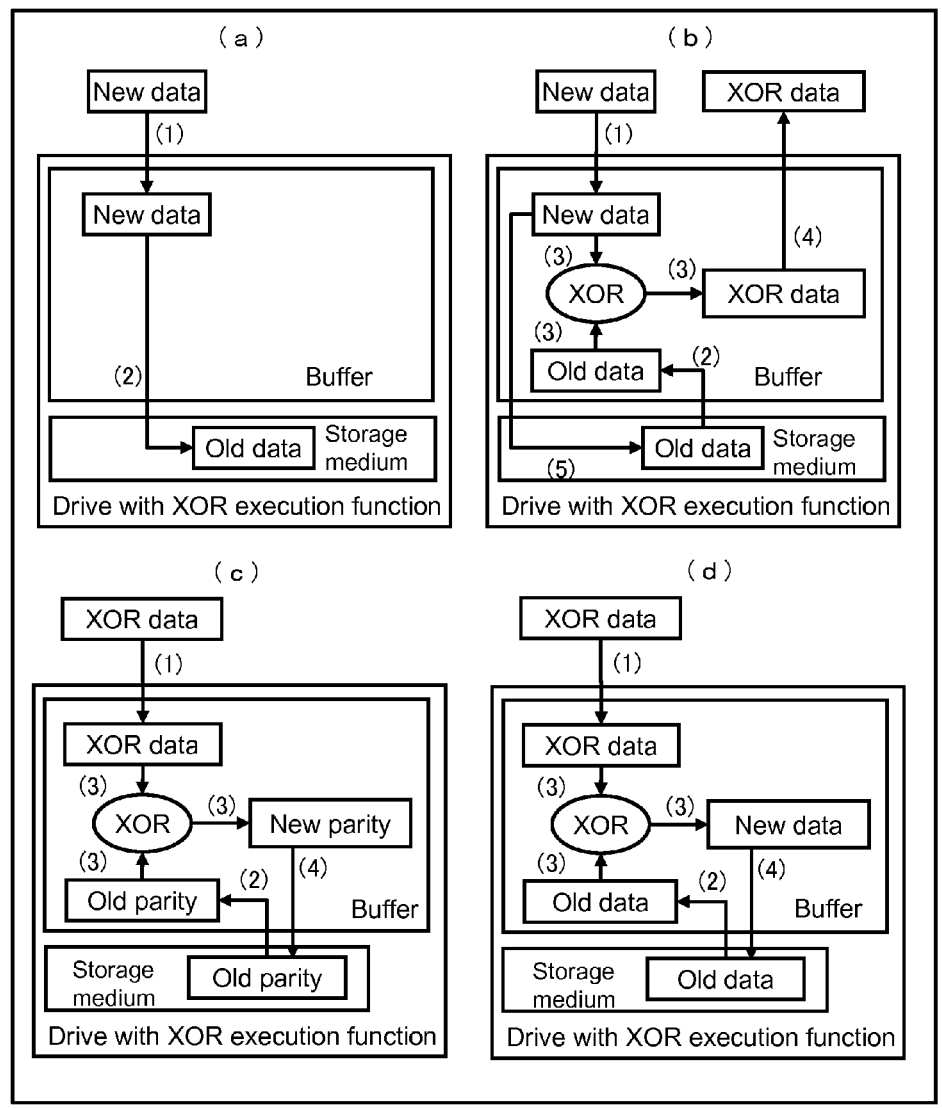
FIG. 25 is a diagram illustrating the conceptual behavior of a drive with an XOR execution function in Embodiment 2 and Embodiment 1.

Next the action of a drive with an XOR execution function will be described schematically with reference to FIG. 25.

In the following description, a drive with an XOR execution function will be abbreviated to "drive". Moreover, in the drawing the terms "new data", "old data", "old parity", "new parity" and "XOR data" are respectively identical to those described for FIG. 26.

The drive comprises a drive controller and a storage medium, and moreover this drive controller comprises an external interface for connections to an external apparatus (back-end controller 160), an internal interface for connections to the storage medium, and a buffer for temporarily storing data. The storage medium can employ a variety of non-volatile memories or a magnetic disk. In the following description the storage medium for the drive and the buffer will respectively be simply abbreviated to storage medium and buffer.

In the diagram, (a) represents the conceptual operation where the drive controller writes new data received from controller 110 to the drive. (b) in the diagram represents the conceptual operation where, after receiving new data from controller 110, the drive controller generates XOR data within the drive and writes the new data received to the storage medium together with sending the generated XOR data to controller 110. (c) in the diagram represents the conceptual operation where, after receiving XOR data from controller 110, the drive controller creates new parity within the drive, writing the generated new parity to the storage medium. (d) in the diagram represents the conceptual operation where, after receiving XOR data from controller 110, the drive controller creates new data, writing the generated new data to the storage medium.

By employing a drive with an XOR execution function in storage 100, it is possible to offload the generation of the XOR data, new parity, and new data to the drive with an XOR execution function. By this means, it is possible to lessen the processing burden on controller 110, and reduce the quantity of data received and transmitted between controller 110 and cache memory 120.

Figure 4:
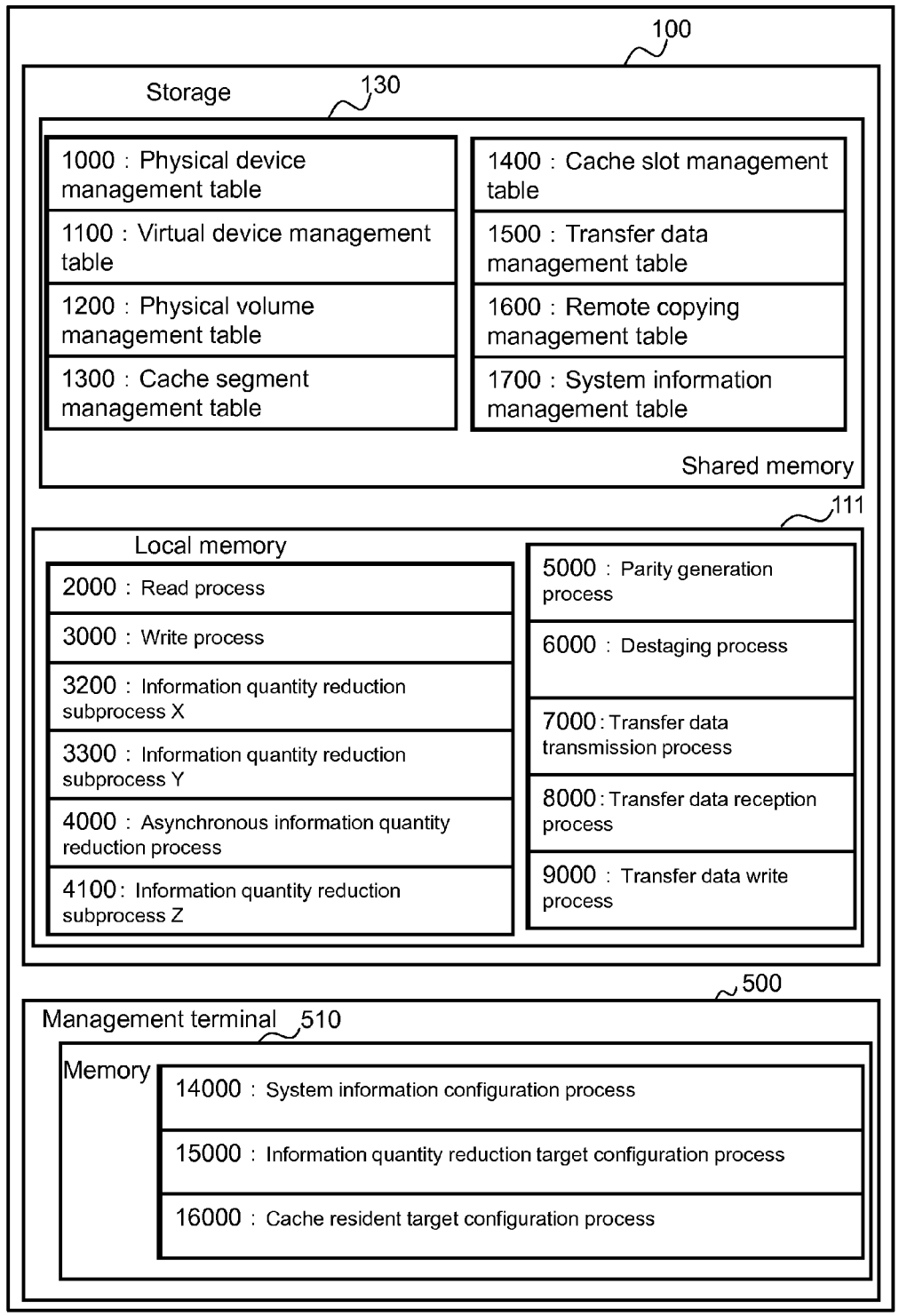
FIG. 4 is a diagram illustrating a configuration of the logical structure of the shared memory and local memory for the storage, and the management terminal in Embodiment 1.

FIG. 4 is a diagram illustrating the logical structure in shared memory 130, local memory 111, and memory 510 of management terminal 500 in the storage 100.

Physical device management table 1000, virtual device management table 1100, logical volume management table 1200, cache segment management table 1300, cache slot management table 1400, transfer data management table 1500, remote copying management table 1600, and system information management table 1700 are stored within shared memory 130.

The programs for read process 2000, write process 3000, information quantity reduction subprocess X 3200, information quantity reduction subprocess Y 3300, synchronous information quantity reduction process 4000, information quantity reduction subprocess Z 4100, parity generation process 5000, destaging process 6000, transfer data transfer process 7000, transfer data reception process 8000, and transfer data writing process 9000 are all stored in local memory 111.

The programs for system information integration process 14000, information quantity reduction target configuration progress 15000, and cache resident target configuration process 16000 are all stored in memory 510.

Physical device management table 1000 is a table for managing drives 170 within storage 100. Virtual device management table 1100 is a table for managing virtual devices within storage 100. Logical volume memory table 1200 is a table for managing logical volumes within storage 100. Remote copying management table 1600 is a table for managing the pair of master volume 10L and duplicate volume 10R (called the remote copy pair) which configure the remote copying. A description will be given as necessary for all of the information contained in the tables.

FIG. 5 is a diagram showing the structure of cache slot management table 1400.

Cache slot management table 1400 is a table for managing the cache slots in storage 100.

Cache slot management table 1400 comprises columns for ID 1401, state 1402, necessary data lost bitmap 1403, and XOR data bitmap 1405. Moreover, cache slot management table 1400 is also configured with columns for managing the cache segments relating to the cache slots.

ID 1401 holds an identifier for unique identification of a cache slot within storage 100. State 1402 holds information showing the state of the cache slot. Necessary data lost bitmap 1403 is used where the information quantity reduction process (4) in FIG. 26 is carried out asynchronously to the write data reception (1) in the same diagram (where the information quantity reduction process timing 1707 to be explained later is "asynchronous") and holds information used to determine whether or not new data necessary for carrying out information quantity reduction process (4) is present within main storage 100L.

Information held in necessary data lost bitmap 1403 is a bitmap for managing whether new data that is the data necessary for information quantity reduction process (4) in the same diagram for example has been lost before information quantity reduction process (4) in the diagram has been conducted. The bits of the bitmap correspond to one subblock, with each bit able to hold a "0" or a "1". Bit value "0" indicates that "the necessary data has not been lost", and bit value "1" indicates that "the necessary data has been lost". In FIG. 26, where main storage 100L receives new write data, and the new data in the cache memory in the diagram is overwritten by this write data, the bit value "1" expressing that "the necessary data has been lost," is recorded in the bit (s) of the necessary data lost bitmap 1403.

CPU 112 determines whether or not new data that is the necessary data has been lost based on the information stored in the necessary data lost bitmap 1403 before executing the information quantity reduction process (4) in the diagram. XOR data bitmap 1405 will be described later, as it is a column used for Embodiment 2.

FIG. 6 is a diagram illustrating the structure of transfer data management table 1500.

Transfer data management table 1500 is a table for managing transfer data 30 within storage 100.

Transfer data management table 1500 comprises columns for ID 1501, write information/write sequence number 1502, subblock change presence bitmap 1503, and information quantity reduction process completion flag 1504. Transfer data management table 1500 may also comprise a column not shown in the diagram for addresses in the journal volume.

An identifier for uniquely identifying transfer data 30 within storage 100 is held in ID 1501. Information identical to the previously described write information 35 and write sequence number 36 is held in write information/write sequence number 1502. It should be noted that the initial value for write sequence number 36 is "0". Information identical to the previously described subblock change presence bitmap 38 is held in subblock change presence bitmap 1503.

A flag for managing whether or not the information quantity reduction process (4) in the diagram is complete is held in information quantity reduction process completion flag 1504, and is used when the information quantity reduction process (4) in FIG. 26 is carried out asynchronously to write data reception (1) in the diagram (where the information quantity reduction process timing 1707 to be described later is "asynchronous"). The flag can contain either of the values "complete" and "incomplete", and its initial value is "incomplete".

The address in the journal volume may house an address within transfer data 30 or primary journal volume 20L and secondary journal volume 20R in which transfer data 30 is to be stored.

Where transfer data 30 is stored in the cache memory, the cache slot corresponding to the cache segments in which the transfer data is stored can be specified by CPU 112 searching the cache directory using as a key the identifier of the virtual device corresponding to the logical volume number of the primary journal volume 20L and secondary journal volume 20R and the address within the virtual device corresponding to journal volume address 1505.

FIG. 7 is a diagram illustrating the structure of system information management table 1700.

System information management table 1700 is a table for managing statistical information and various system parameters within storage 100.

System information management table 1700 comprises columns for write sequence number 1701, cache resident quantity 1702, transfer data cumulative quantity 1703, subblock size 1704, synchronous information quantity reduction flag 1705, information quantity reduction process classifier 1706, information quantity reduction process timing 1707, and acceptance flag 1708 for XOR data in the cache memory.

Information for controlling the write sequence of write data to duplicate volume 10R during asynchronous remote copying as described above is held in write sequence number 1701. Write sequence number 1701 is subject to an increment of just one each time CPU 112 receives a write command.

By virtue of suppressing the discarding or reusing of a cache slot, the process of having data resident on the cache memory is referred to as a cache resident process. Cache residence quantity 1702 holds data for managing the total quantity of cache segments relating to a cache slot for which the residence flag (not shown in the diagram) of cache slot management table 1400 (a flag showing whether or not the current cache slot is a target for the cache residence process) is "on".

Information for managing the overall quantity of transfer data 30 managed by transfer data management table 1500 is held in transfer data accumulation quantity 1703. CPU 112 updates transfer data 30 accumulation quantity 1703 appropriately, according to the generation/discarding of transfer data. The previously described subblock size is held in subblock size 1704.

A flag designating whether or not to execute the information quantity reduction process (4) in FIG. 26 where information quantity reduction process timing 1707 to be described later is "asynchronous" (information quantity reduction process (4) in FIG. 26 is carried out asynchronously to write data reception (1) in the same diagram), and moreover, the classification of the cache hit/miss determination result is "miss", is held in synchronous information quantity reduction flag 1705. The flag can contain either of the values "on" and "off". Where the flag is "on", CPU 112 executes information quantity reduction process (4) in the diagram. Moreover, where the flag is "off", CPU 112 does not execute information quantity reduction process (4).

Information designating the format for the transfer dataset generation process carried out at the information quantity reduction process (4) in the diagram, as described for FIG. 26, is held in information quantity reduction process classifier 1706. This information can contain any of the values "0 fill", "discard" and "XOR data".

Information designating the timing of the execution of information quantity reduction process (4) in FIG. 26 is held in information quantity reduction process timing 1707. This information can contain either of the values "synchronous" and "asynchronous". Where the value is "synchronous", CPU 112 carries out information quantity reduction process (4) in the diagram synchronously with write data reception (1) in the diagram. Moreover, where the value is "asynchronous", CPU 112 carries out the information quantity reduction process (4) in the diagram asynchronously with write data reception (1). XOR data acceptance flag 1708 in the cache memory is information used in Embodiment 2 and will be described later.

In what follows a description will be given of the operation of the various processing programs in local memory 111 and memory 510 with reference to a flow chart (where there is a flow chart). It should be noted that the following description presumes that drive 170 is a "general-purpose drive", and a supplementary description will be given for the process carried out where drive 170 is a "drive with an XOR execution function". Where drive 170 is a "drive with an XOR execution function", the process of reading out old data and old parity from drive 170 to the cache memory is omitted, and it is possible to offload processes for generating XOR data, new parity and new data to drive 170.

The general operation of read process 2000 is identical to the read process already described, so its description will be omitted. The operation of write process 3000 will now be described with reference to the flowcharts in FIG. 8, FIG. 9, and FIGS. 11 to 14.

FIG. 8 is the main flowchart for write process 3000.

At S3001, main storage 100L receives a write command (write request) from host 200L. Hereinafter write data corresponding to this write command will be referred to as current write data.

At S3002, main storage 100L obtains the current write sequence number by referring to write sequence number 1701 system in information management table 1700. Main storage 100L subsequently increments write sequence number 1701 by just one.

At S3003, main storage 100L determines the cache hit/miss together with specifying the subblock for the write target (referred to as the current subblock). At S3004, if the results of the cache hit/miss determination and the cache slot corresponding to the current subblock (current cache slot) have been acquired, main storage 100L proceeds to the process in S3006, and if the current cache slot has not been acquired, proceeds to process S3005.

At S3005, main storage 100L acquires the current cache slot. Specifically, main storage 100L acquires one cache slot from the available cache slots, registers the acquired cache slot in the cache directory, and configures the initial values indicated in the following steps (1) to (4) for each column as an entry in cache slot management table 1400 corresponding to the acquired cache slot. (1) Main storage 100L stores in ID 1401 an identifier which uniquely identifies the current cache slot in the current table. (2) Main storage 100L stores an invalid value instate 1402. (3) Main storage 100L registers a bitmap configured only with bit values of "0" in necessary data lost bitmap 1403. (4) Main storage 100L registers a bitmap configured only with bit values of "0" in XOR data bitmap 1405.

At S3006, main storage 100L determines whether or not a cache segment for storing the current write data has been acquired. If it has been acquired, main storage 100L proceeds to the process of S3008. If it has not been acquired, main storage 100L proceeds to the process in S3007.

At S3007, main storage 100L acquires a cache segment. In what follows, where a cache slot has been found in S3003, the cache slot found in S3003 is referred to as the current cache slot, and where a cache slot is not found in S3003, the cache slot acquired in S3005 is referred to as the current cache slot. Moreover, in what follows where a cache segment is found in S3003, the cache segment found in S3003 is referred to as the current cache segment, and where a cache segment is not found in S3003, the cache segment acquired in S3007 is referred to as the current cache segment.

At S3008, main storage 100L adds an entry to transfer data management table 1500, and configures write sequence numbers and the like. Specifically, main storage 100L adds a new entry to transfer data management table 1500, and stores initial values as follows in each column of the new entry. (1) Main storage 100L stores an identifier which uniquely identifies the current entry in the current table in ID 1501. (2) Main storage 100L stores data identical to write information 35 described above as write information in write information/write sequence number 1502, and stores the write sequence number acquired at S3002 as the write sequence number. (3) Main storage 100L stores a bitmap comprised only of bit values "1" in subblock change presence bitmap 1503. (4) Main storage 100L stores "incomplete" in the information quantity reduction process completion flag 1504. (5) Main storage 100L stores the address of an open area in primary journal volume 20L in journal volume address 1505.

At S3009, main storage 100L acquires the transfer data. Specifically, main storage 100L acquires a cache slot and cache segment corresponding to journal volume address 1505 configured at S3008, and stores the transfer data 30 in the acquired cache segment. Here transfer data 30 has a structure of the type shown in transfer data 30a in FIG. 3, and transfer data management information 31 has the structure of the type shown in transfer data management information 31a in FIG. 3. Main storage 100L then respectively configures the write information/write sequence number/subblock change presence bitmap stored in S3008 in write information 35, write sequence number 36, and subblock change presence bitmap 38 in the current transfer data 30. It should be noted that at this point payload 32 is empty.

At S3010, main storage 100L refers to information quantity reduction process timing 1707 of system information managing table 1700 and determines whether or not the information quantity reduction process timing is "synchronous" or "asynchronous". Where the determination result is "synchronous", main storage 100L proceeds to process S3011. Moreover, where the determination result is "asynchronous", main storage 100L proceeds to process S3014. It should be noted that where the information quantity reduction process timing is "asynchronous", if the result of the cache hit/miss determination at S3003 is a "hit", it can be configured to proceed to S3011. In this case, there is the advantage that the information quantity reduction process (process (4) in FIG. 26) can be reliably carried out.

At S3011, main storage 100L determines whether the determination result for the cache hit/miss at S3003 is either "hit" or "miss". Where it is a "hit", main storage 100L proceeds to process S3012. Where it is a "miss", main storage 100L proceeds to process S3013.

At S3012, main storage 100L activates the process of subroutine "A" in FIG. 9. At S3013, main storage 100L activates the process of subroutine "B" in FIG. 13. At S3014, main storage 100L activates the process of subroutine "C" in FIG. 14. At S3015, main storage 100L appropriately updates cache slot management table 1400.

At S3016, main storage 100L sends a write completion report to host 200L, and terminates write process 3000. It should be noted that the reception of current write data is carried out in the process described in FIG. 9, FIG. 13 and FIG. 14.

FIG. 9 is a flow chart for subroutine "A" 3100.

At S3101, main storage 100L sends a write data reception preparation completion to host 200L. At S3102, main storage 100L receives the current write data at buffer 151 of main storage 100L (the received current write data is referred to as new data).

At S3103, main storage 100L copies the data in the cache memory corresponding to the current write command (referred to as old data) to local memory 111. As subroutine "A" is a subroutine which operates where the results of the cache hit/miss determination are "hit", it ensures that the old data is present in the cache segment.

At S3104, data received at S3102 is copied to local memory 111 in addition to being copied to the current cache segment in write process 3000.

Before describing the steps subsequent to S3105, the information quantity reduction subprocess X 3200 will first be described with reference to FIG. 10 and FIG. 11.

Information quantity reduction subprocess X 3200 is a process which corresponds to the process which configures the subblock change presence bitmap in information quantity reduction process (4) in FIG. 26. Subblock change presence bitmap 1503 entry in transfer data management table 1500 added at S3008 and subblock change presence bitmap 38 for transfer data 30 acquired at S3009 are referred to as the current subblock change presence bitmap.

A suitable value for the current subblock change presence bitmap is configured in information quantity reduction subprocess X 3200. Various methods of configuration exist for configuring the subblock change presence bitmap in information quantity reduction subprocess X 3200, depending on the pattern of data used in information quantity reduction subprocess X 3200.

FIG. 10 is a table which illustrates the patterns of data used in information quantity reduction subprocess X 3200 (the process configuring the subblock change presence bitmap).

Four types of pattern (a) to (d) are used for the data. The "o" in the table indicates the fact that it is "used". Five types of data can be used: "new data", "old data", "XOR data", "guarantee code for new data" and "guarantee code for old data".

"New data" is the new data in FIG. 26 (or the new data in S3102), the "old data" being the old data in FIG. 26 (or the old data in S3103), with the "XOR data" being the XOR data in FIG. 26. For example in pattern (c), "XOR data", "new data guarantee code" and "old data guarantee code" are used.

Figure 11:
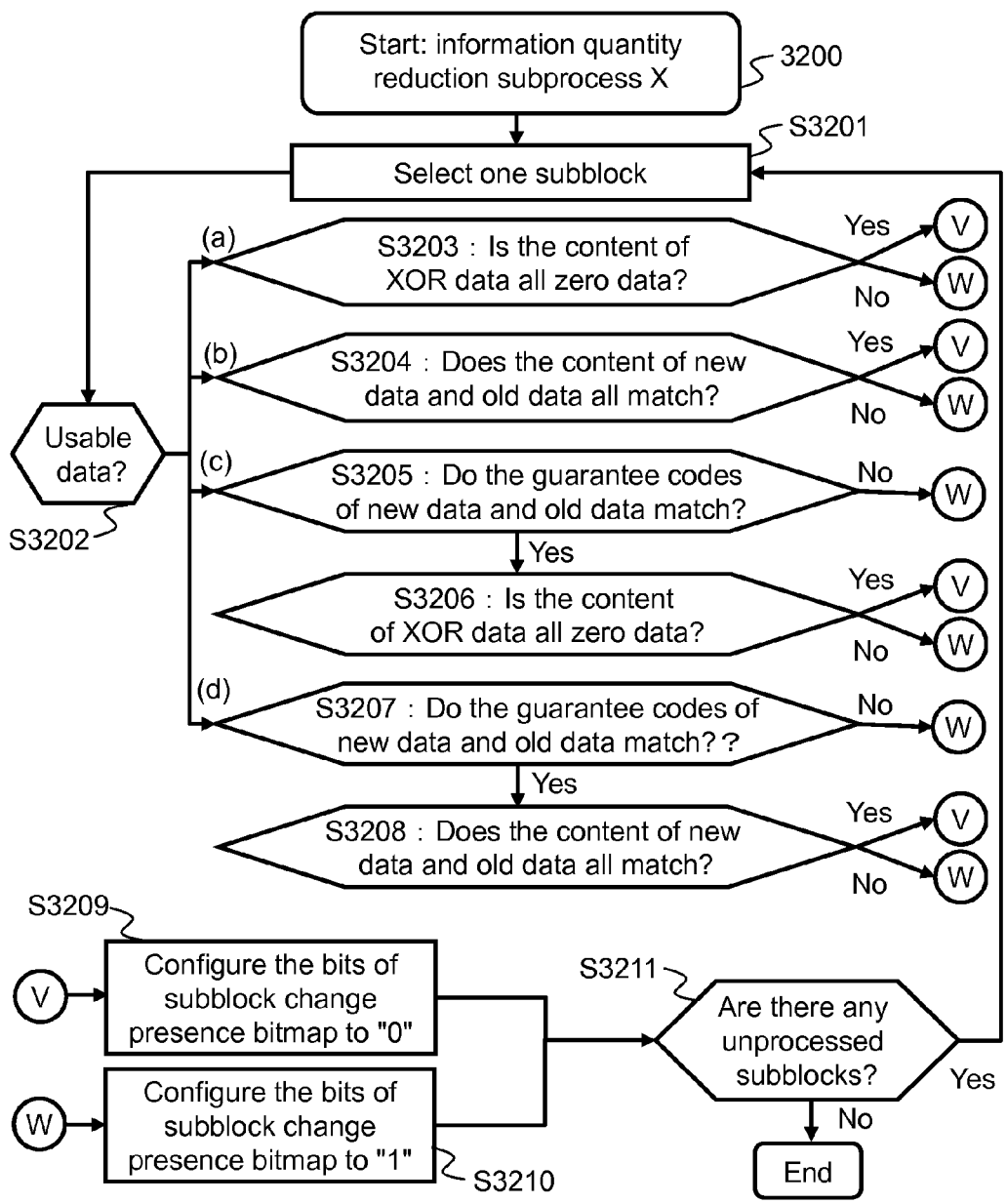
FIG. 11 is a diagram illustrating a flowchart for information quantity reduction subprocess X in Embodiment 1 and Embodiment 2.

FIG. 11 is a flow chart for information quantity reduction subprocess X 3200.

With information quantity reduction subprocess X 3200, appropriate values are configured in subblock change presence bitmap 1503 for the current entry in transfer data management table 1500, and the corresponding subblock change presence bitmap 38 for transfer data 30.

At S3201, main storage 100L selects one subblock. A numbered subblock such as the "first" subblock or the "second" subblock is selected. The process is carried out on subblocks contained in the new data (or old data).

At S3202 main storage 100L determines the pattern of the data used. The pattern of the data being used can be any of the four patterns (a) to (d) in FIG. 10. Information on which pattern to use is stored in local memory 111 within storage 100. Where the pattern of data used is (a), (b), (c) or (d), the process moves on respectively to S3203, S3204, S3205, or S3207.

At S3203 (where the pattern of data used is (a)), main storage 100L (CPU 112) reads data for the target subblock of the XOR data, and determines whether the content of the data read is "all 0 data". Here "all 0 data" means that it is a subblock in which all of the bit values are "0".

At S3204 (where the pattern of data used is (b)), main storage 100L (CPU 112) reads the new data and the old data, and determines whether the content of the target subblock for the new data completely matches the content of the target subblock for the old data.

At S3205 (where the pattern of the data used is (c)), main storage 100L determines whether there is a complete match between the guarantee code for the target subblock of the new data and the guarantee code for the target subblock of the old data.

At S3206, main storage 100L carries out an identical process to the process in S3203. Even where there is a complete match between the guarantee codes, it does not mean that there is a complete match between the data in the corresponding subblocks.

At S3207 (where the pattern of the data used is (d)), main storage 100L determines whether there is a complete match between the guarantee code of the target subblock for the new data and the guarantee code for the target subblock for the old data.

At S3208, main storage 100L carries out a process identical to the process in S3204. Even where there is a complete match between the guarantee codes, it does not mean that there is a complete match between the data in the corresponding subblocks.

Using the determination results from the above S3203 to S3208, there is now a branching between either "V" or "W". At S3209, main storage 100L configures the bit corresponding to the target subblock of the current subblock change presence bitmap to "0", indicating "no change".

At S3210, main storage 100L configures the bit corresponding to the target subblock for the current subblock change presence bitmap to "1" indicating "change".

At S3211, main storage 100L determines whether there are any unprocessed subblocks present, and where the determination result is "yes", main storage 100L proceeds to process S3201. Where the determination result is "no", main storage 100L terminates information quantity reduction subprocess X 3200.

The advantages of patterns (a) and (b) in FIG. 10 is that even for storage 100 where no guarantee codes are stored, it is possible to configure a suitable value for the subblock change presence bitmap.

The advantage of patterns (c) and (d) in FIG. 10 is that there are cases where it is possible to reduce the number of times processes S3206 and S3208 are executed in FIG. 11 (this is because where there is no match between the guarantee code for the subblock corresponding to the old data and the subblock of the new data, the data stored in the subblocks is different, and there is no need to compare the data of the subblocks), and it is possible to reduce the processing burden on controller 110 (CPU 112) of main storage 100L.

Returning again to FIG. 9, the steps subsequent to S3105 will be described.

At S3105, main storage 100L calculates the XOR as necessary for new data and old data, and generates XOR data. Specifically, where pattern (a) or (c) (patterns which employ "XOR data") is used in FIG. 10, or the information quantity reduction process classifier 1706 of system information management table 1700 is "XOR data", main storage 100L calculates the XOR for new data and old data in local memory 111, and stores the XOR data obtained by calculation in the local memory 111.

At S3106, main storage 100L activates information quantity reduction subprocess X 3200 described earlier. At S3107, main storage 100L refers to information quantity reduction process classifier 1706 of system information management table 1700 and determines the classification of information quantity reduction process. Where the determination result is "discard", main storage 100L proceeds to process S3108. Where the determination result is "0 fill", main storage 100L proceeds to process S3109. Moreover, where the determination result is "XOR data", main storage 100L proceeds to process S3111.

At S3108, main storage 100L copies only subblocks of the necessary new data to the transfer data. Specifically, main storage 100L refers to the subblock change presence bitmap configured in S3106, and copies only left-justified subblocks of new data corresponding to the bit for which "1" indicating "change" has been configured to payload 32 of transfer data 30a. It should be noted that the size of payload 32 and transfer data 30a can be adjusted appropriately.

At S3109, main storage 100L copies the new data to payload 32 of transfer data 30a. At S3110, main storage 100L activates information quantity reduction subprocess Y 3300 in FIG. 12.

At S3111, main storage 100L copies the XOR data generated at S3105 to payload 32 of transfer data 30a. At S3112, main storage 100L configures information quantity reduction process completion flag 1504 for the entry in transfer data management table 1500 added at S3008 to "complete".

Figure 12:
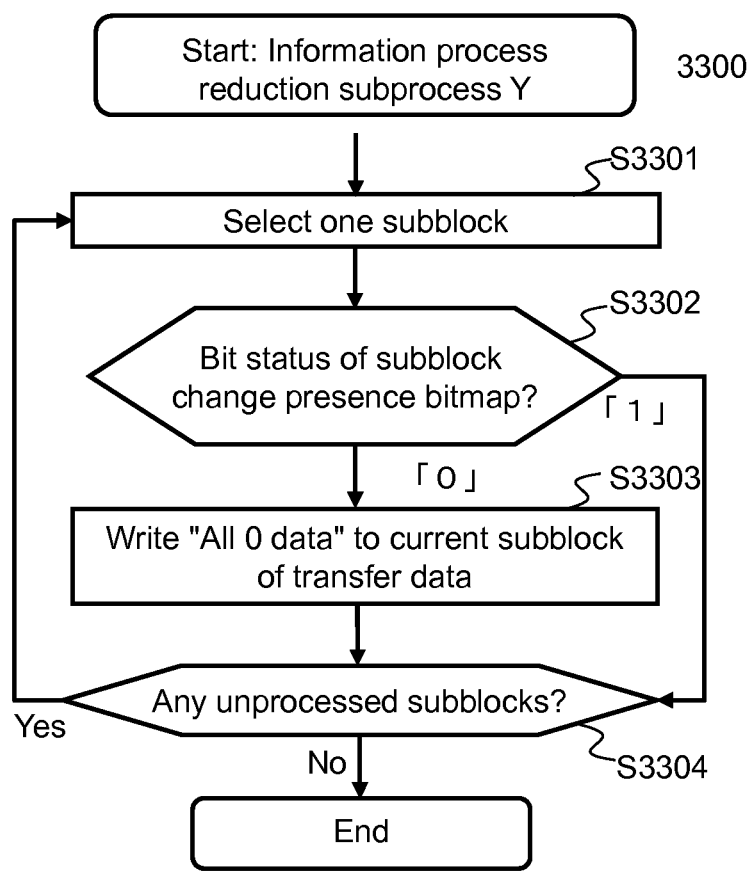
FIG. 12 is a diagram illustrating a flowchart for information quantity reduction subprocess Y in Embodiment 1 and Embodiment 2.

FIG. 12 is a flow chart for information quantity reduction subprocess Y 3300.

At S3301, main storage 100L selects one subblock. The content of the process is identical to that at S3201.

At S3302, main storage 100L refers to the values for bits in the current subblock change presence bitmap corresponding to the target subblock. Where the value is "0" indicating "no change", main storage 100L proceeds to process S3303. Moreover, where the value is "1", indicating "change", main storage 100L proceeds to process S3304.

At S3303, main storage 100L writes "all 0 data" into the target subblock for payload 32 of transfer data 33a. Here "all 0 data" indicates a subblock for which the values of all the bits are "0".

At S3304, main storage 100L determines whether any unprocessed subblocks are present. Where they are present, main storage 100L proceeds to process S3301. Moreover, where they are not present, main storage 100L terminates information quantity reduction subprocess Y 3300.

Figure 13:
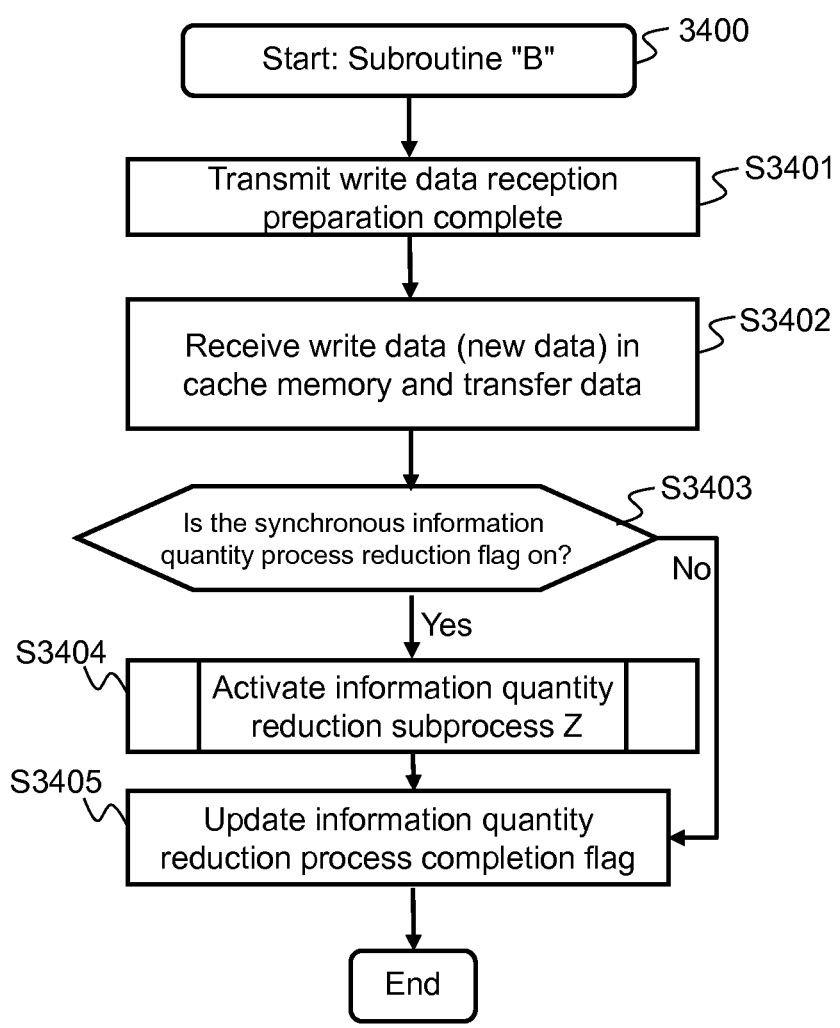
FIG. 13 is a diagram illustrating a flowchart for subroutine "B" in Embodiment 1 and Embodiment 2.

FIG. 13 is a flow chart for subroutine "B" 3400.

At S3401, main storage 100L transmits a write data reception preparation completion to host 200L. At S3402, main storage 100L receives the write data in payload 32 of transfer data 30a acquired at S3009 and the current cache segments in write process 3000. The received current write data are referred to as the new data.

At S3403, reference is made to synchronous information quantity reduction flag 1705 of system information management table 1700 and a determination is made as to whether or not its value is "on". Where the determination result is "yes" (where the value is "on"), main storage 100L proceeds to process S3404. Moreover, where the determination result is "no" (where the value is "off"), main storage 100L proceeds to process S3405.

At step S3404, main storage 100L activates information quantity reduction subprocess Z 4100 in FIG. 16 to be explained later. At S3405, main storage 100L configures information quantity reduction process completion flag 1504 for the entry in transfer data management table 1500 added at S3008 to "complete", and terminates subroutine "B" 3400.

With write process 3000, where it is desired to shorten the write response time (the time from S3001 to S3016 in FIG. 8) by configuring data synchronous information quantity reduction flag 1705 to "off" (at system information configuration process 14000 to be explained later), main storage 100L skips process S3404, enabling the write response time to be shortened. At the same time, where it is desired to reliably carry out the information quantity reduction process, by configuring data synchronized information quantity reduction flag 1705 to "on" (at system information configuration process 14000 to be explained later), main storage 100L executes process S3404, and it is possible to reduce the quantity of information in the transfer data.

It should be noted that it is possible for main storage 100L to automatically configure synchronous information quantity reduction flag 1705 dynamically, so for example where (1) the value of transfer data cumulative amount 1703 exceeds a threshold previously configured (in other words when transfer data has accumulated with a high WAN usage rate) the quantity of information for transfer data can be reduced by the information quantity reduction process by setting synchronous information quantity reduction flag 1705 to "on" (and subsequently reducing the quantity of data of the transfer data by a compression process), in this way enabling a reduction in the usage rate for the WAN line. Moreover, where (2) this is not the case, process S3404 can be skipped by configuring synchronous information quantity reduction flag 1705 to "off", thereby enabling a reduction in the processing load on controller 110 of main storage 100L and a shortening of the read response time.

Moreover, where drive 170 in which the data of master volume 10L corresponding to the new data is stored is a type of semiconductor disk which has a short readout response time (for example, compared to a magnetic disk drive), the time required for main storage 100L to read old data from drive 170 in FIG. 26 is shortened, and thus the time required for the process in S3404 which uses the old data is reduced, and as the execution of the process in S3404 means the write response time is not quite as long, it is possible to have main storage 100L automatically set synchronous information quantity reduction flag 1705 temporarily to "on" at S3403, enabling a structure whereby it proceeds to the process in S3404. By this means it is possible to reliably ensure that main storage 100L carries out the information quantity reduction process.

Figure 14:
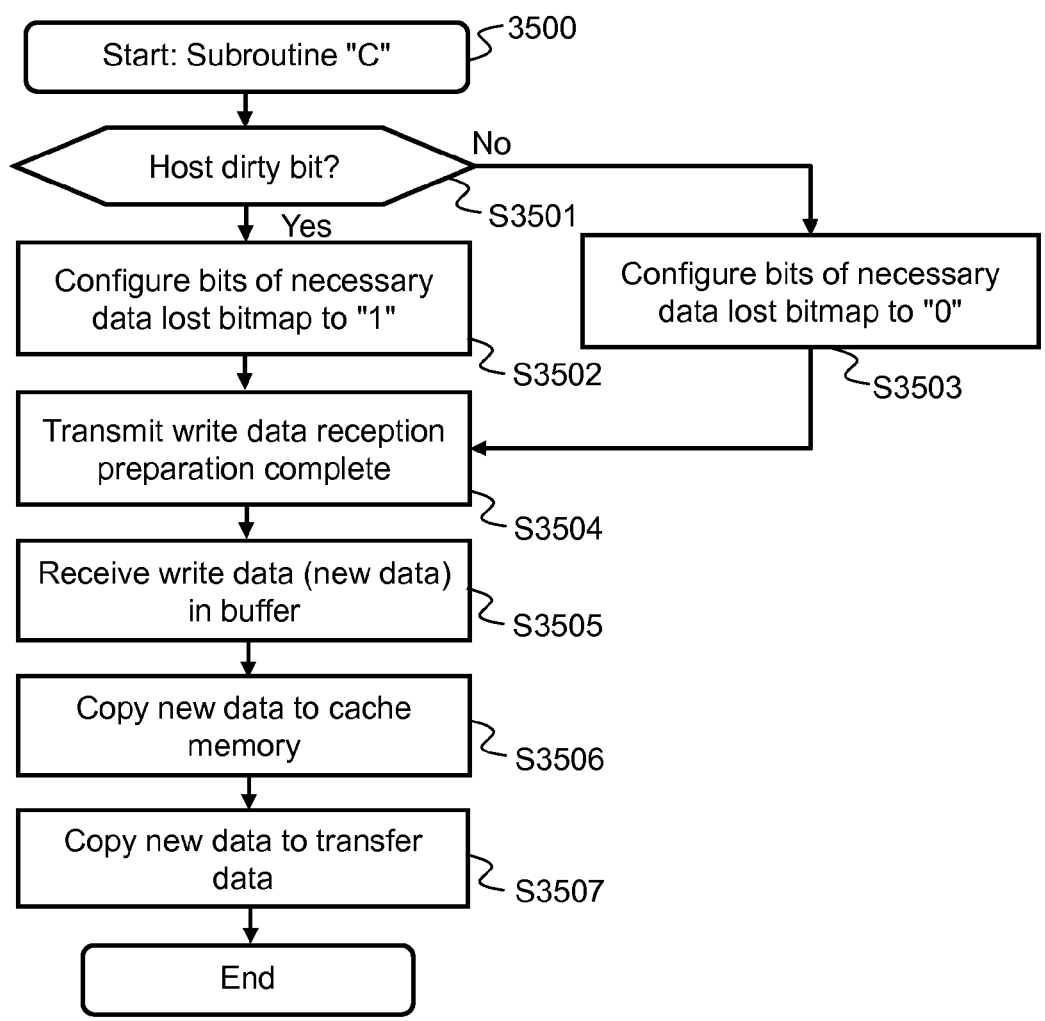
FIG. 14 is a diagram illustrating a flowchart for subroutine "C" in Embodiment 1.

FIG. 14 is a flow chart for subroutine "C" 3500.

At S3501, main storage 100L determines whether or not the result of determination for the cache hit/miss in S3003 was a "host dirty hit" or not. Here, a "host dirty hit" means a "hit" in the case where dirty data for which the parity generation process has not been executed is contained in the cache slot corresponding to the current write data. Where the determination result is "yes" (where there is a "host dirty hit"), the process proceeds to S3502. Where the determination result is "no", main storage 100L proceeds to process S3503.

At S3502, main storage 100L configures bits of necessary data lost bitmap 1403 of the current cache slot that correspond to the current write data in write process 3000 to the value "1". At S3503, main storage 100L configures bits of necessary data lost bitmap 1403 of the current cache slot that correspond to the current write data in write process 3000 to the value "0".

At S3504, main storage 100L transmits write data reception preparation completion to host 200L. At S3505, main storage 100L receives the current write data (also referred to as new data) in buffer 151. At S3506, main storage 100L copies the new data received at S3505 to the current cache segment in write process 3000. At S3507, main storage 100L copies the new data received at S3505 to payload 32 of transfer data 33a acquired at S3009.

Figure 15:
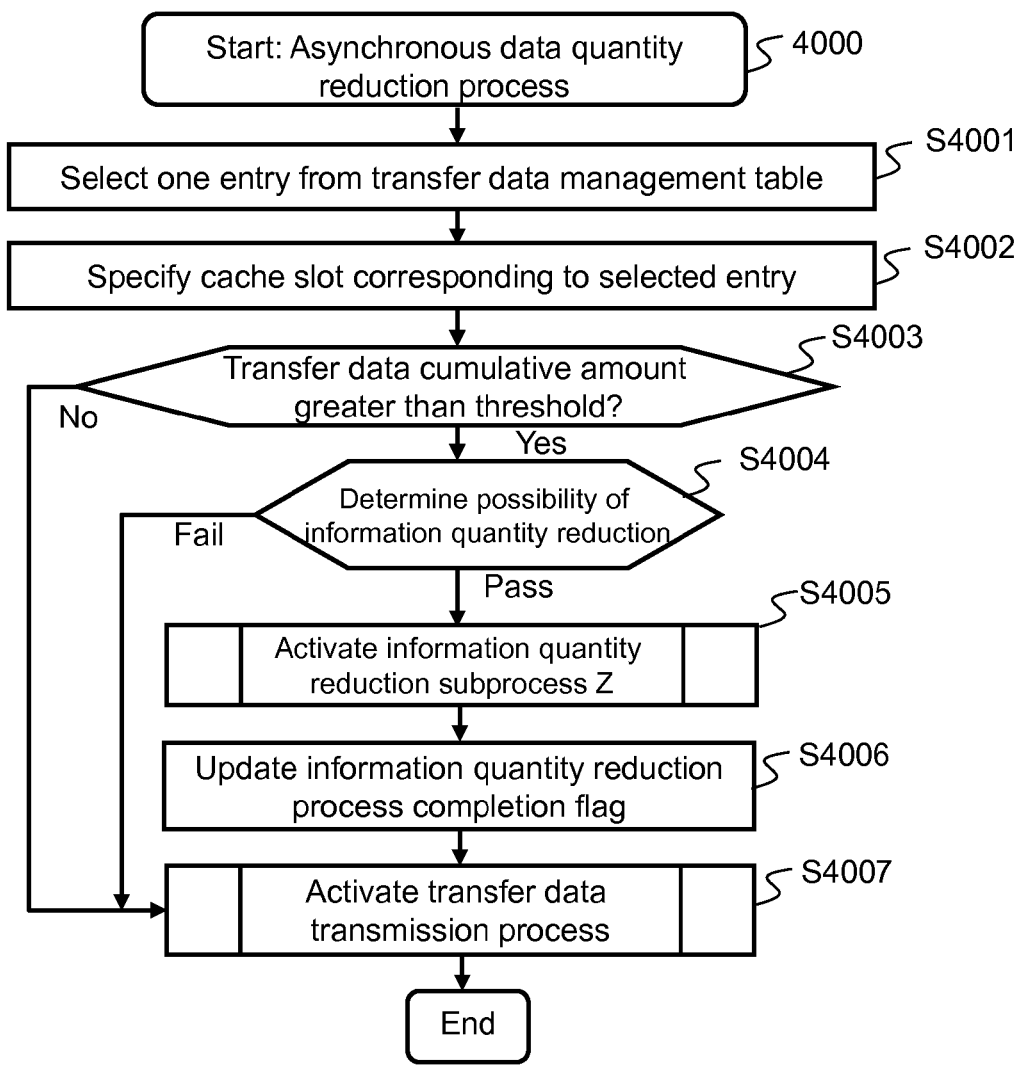
FIG. 15 is a diagram illustrating a flowchart for asynchronous information quantity reduction in Embodiment 1.

FIG. 15 is a flow chart of the asynchronous information quantity reduction process 4000.

Asynchronous information quantity reduction process 4000 is periodically activated at preset time intervals by main storage 100L.

At S4001, main storage 100L selects one of the entries in transfer data management 1500 for which the value of information quantity reduction process completion flag 1504 is "incomplete", and whose write sequence number is the smallest of write information/write sequence numbers 1502. Transfer data 30 corresponding to the selected entry is referred to as the current transfer data.

At S4002, main storage 100L specifies the cache slot corresponding to the entry selected at S4001. Specifically, main storage 100L refers to the write information for the write information/write sequence number 1502 entry selected at S4001, and searches the cache directory using as a key the virtual device identifier obtained based on the logical volume number, LBA and size contained in the write information, and LBA group, and specifies the cache slot corresponding to the entry selected at S4001. Hereinafter, the write data corresponding to this write information is referred to as the current write data. It should be noted that where a cache slot corresponding to the entry selected at S4001 is not found, the asynchronous information quantity reduction process 4000 terminates.

At S4003, main storage 100L determines whether or not the cumulative quantity of transfer data is equal to or larger than the threshold value. Specifically, main storage 100L refers to the value of transfer data cumulative amount 1703, and determines whether this value is equal to or larger than the threshold value for the transfer data cumulative amount. Here the threshold value for the transfer data cumulative amount is configured via management terminal 500 by the user, and is information stored in system information management table 1700. By having the user configure the threshold value for the transfer data cumulative amount to "0", main storage 100L can reliably execute processes S4004 to S4006, enabling the quantity of information in the current transfer data to be reduced.

Where the determination result is "yes", main storage 100L proceeds to process S4004. Where the determination result is "no", main storage 100L proceeds to process S4007.

At S4004, main storage 100L determines possibility of quantity of information reduction. Specifically, where main storage 100L finds a cache slot corresponding to the entries selected at S4002 and S4001, it determines whether reduction in the quantity of information has taken place based on the values of the group of bits corresponding to the current write data in necessary data lost bitmap 1403 for the entries in cache slot management table 1400 corresponding to the cache slot designated at S4002. Only where main storage 100L finds a cache slot corresponding to the entries selected at S4002, S4001, and moreover where the values of the group are all "0" (the necessary data has not been lost) does it determine that the reduction of the quantity of information is "possible", and in all other cases determines that the reduction of the quantity of data is "impossible".

Where the reduction of the quantity of information is "possible", main storage 100L proceeds to process S4005, and where the reduction in the quantity of information is "impossible", main storage 100L moves on to process S4007.

Figure 16:
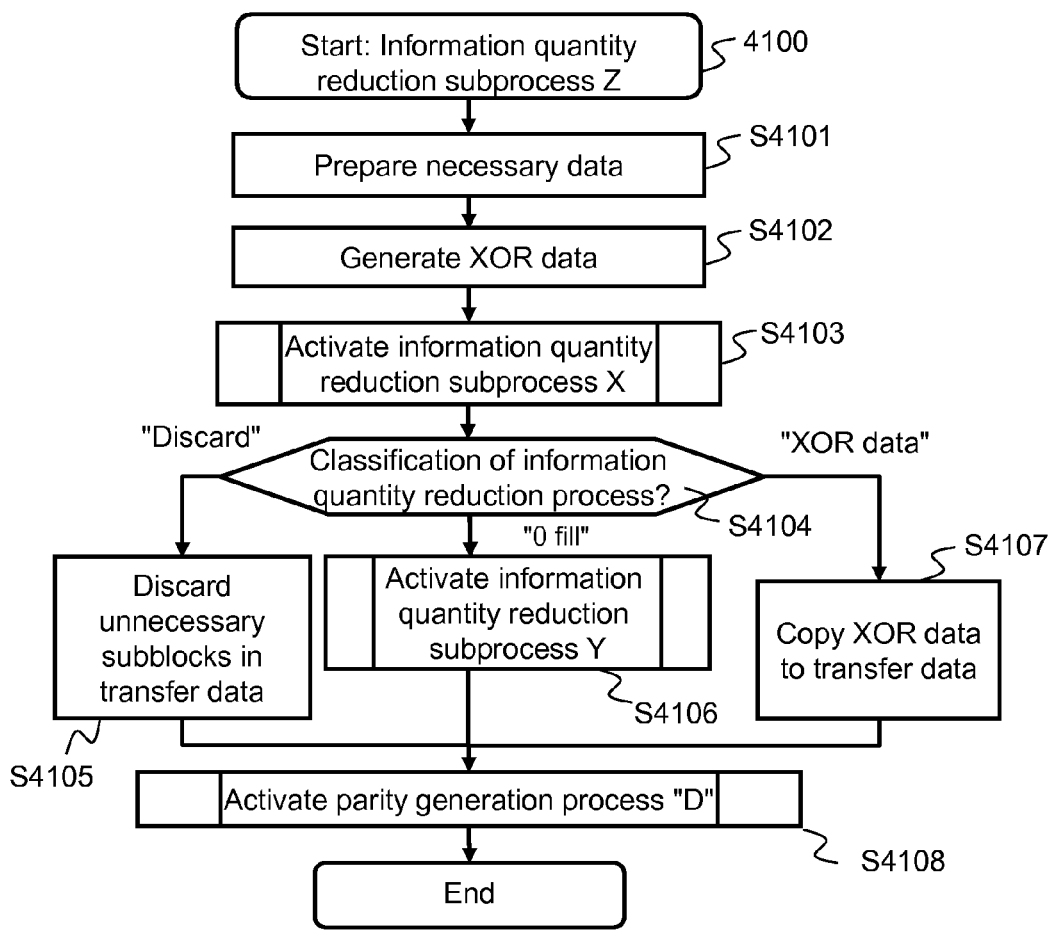
FIG. 16 is a diagram illustrating a flowchart for information quantity reduction subprocess Z in Embodiment 1.

At S4005, main storage 100L activates information quantity reduction subprocess Z 4100 in FIG. 16. At S4006, main storage 100L configures information quantity reduction process completion flag 1504 for the entry selected in S4001 to "complete".

At S4007, main storage 100L designates the entry selected at S4001, and activates transfer data transmission process 7000 in FIG. 19A to be described later. At S7001 of activated transfer data transmission process 7000, main storage 100L selects the entry designated at the time of activation.

At asynchronous information quantity reduction process 4000, as main storage 100L only carries out information quantity reduction process of (4) in FIG. 26 where the transfer data cumulative amount in S4003 is equal to or larger than a threshold value, where the transfer data cumulative amount is small, in other words where the WAN line usage rate is low, it is possible to ensure that the information quantity reduction process is not carried out, enabling a reduction in the processing load on controller 110 and drive 170 of main storage 100L.

FIG. 16 is a flowchart of information quantity reduction subprocess Z 4100.

At S4101, main storage 100L prepares the necessary data. Specifically, main storage 100L first copies the current write data (also called new data) on the cache segment corresponding to the cache slot designated at S4002 to local memory 111. Next main storage 100L carries out a staging process for the old data corresponding to the new data. Main storage 100L then copies the old data to the local memory 111.

At S4102, main storage 100L generates XOR data. Specifically, XOR data are generated by calculating the XOR for the new data and old data copied to local memory 111 at 4101, and the generated XOR data are stored in local memory 111.

At S4103, main storage 100L activates information quantity reduction subprocess X. As "new data", "old data", "XOR data", "guarantee code 34 for new data" and "guarantee code for old data" are present in the local memory 111, main storage 100L is able to use any of patterns (a) to (d) for the data used in "information quantity reduction subprocess X" in FIG. 10. For example, main storage 100L can employ as a pattern (c) or (d) for which the data comparison rate in information quantity reduction subprocess X is low compared to pattern (a) and (b), and the processing burden on controller 110 is low.

At S4104, main storage 100L refers to information quantity reduction processing classifier 1706 of system information managing table 1700, and designates the information quantity reduction process identity. Where the determination result is "discard", main storage 100L proceeds to process S4105. Where the determination result is "0 fill", main storage 100L moves onto process S4106. Moreover, where the determination result is "XOR data", main storage 100L moves onto process S4107.

At S4105, main storage 100L discards subblocks not necessary within the current transfer data. Specifically, main storage 100L first refers to the subblock change presence bitmap configured at S4103. Main storage 100L then left-justifies only those subblocks in payload 32 of the current transfer data corresponding to bits designated as "1" indicating "change" in subblock change presence bitmap in payload 32 of the current transfer data. It should be noted that the size of payload 32 and transfer data 30 may be adjusted appropriately.

At S4106, main storage 100L activates information quantity reduction subprocess Y 3300 in FIG. 12. However, subblocks that are the target of processing for S3301 are subblocks of the current transfer data.

At S4107, main storage 100L copies the XOR data generated at S4102 to the payload 32 of the current transfer data. At S4108, main storage 100L activates process "D" of parity generation process 5000 in FIG. 17. With process "D", main storage 100L uses the XOR data generated at S4102 to generate new parity. It should be noted that to avoid an infinite loop, main storage 100L skips process S5006.

With information quantity reduction subprocess Z 4100, main storage 100L no longer needs to generate separate XOR data for parity generation as the XOR data generated to execute information quantity reduction process of (4) in FIG. 26 (corresponding to S4102) can also be used to generate parity for (8) in FIG. 26 (corresponding to S4108) (and in some cases there will be no need to read the old data). Due to this, it is possible to reduce the burden on controller 110 and drive 170 of main storage 100L.

Figure 17:
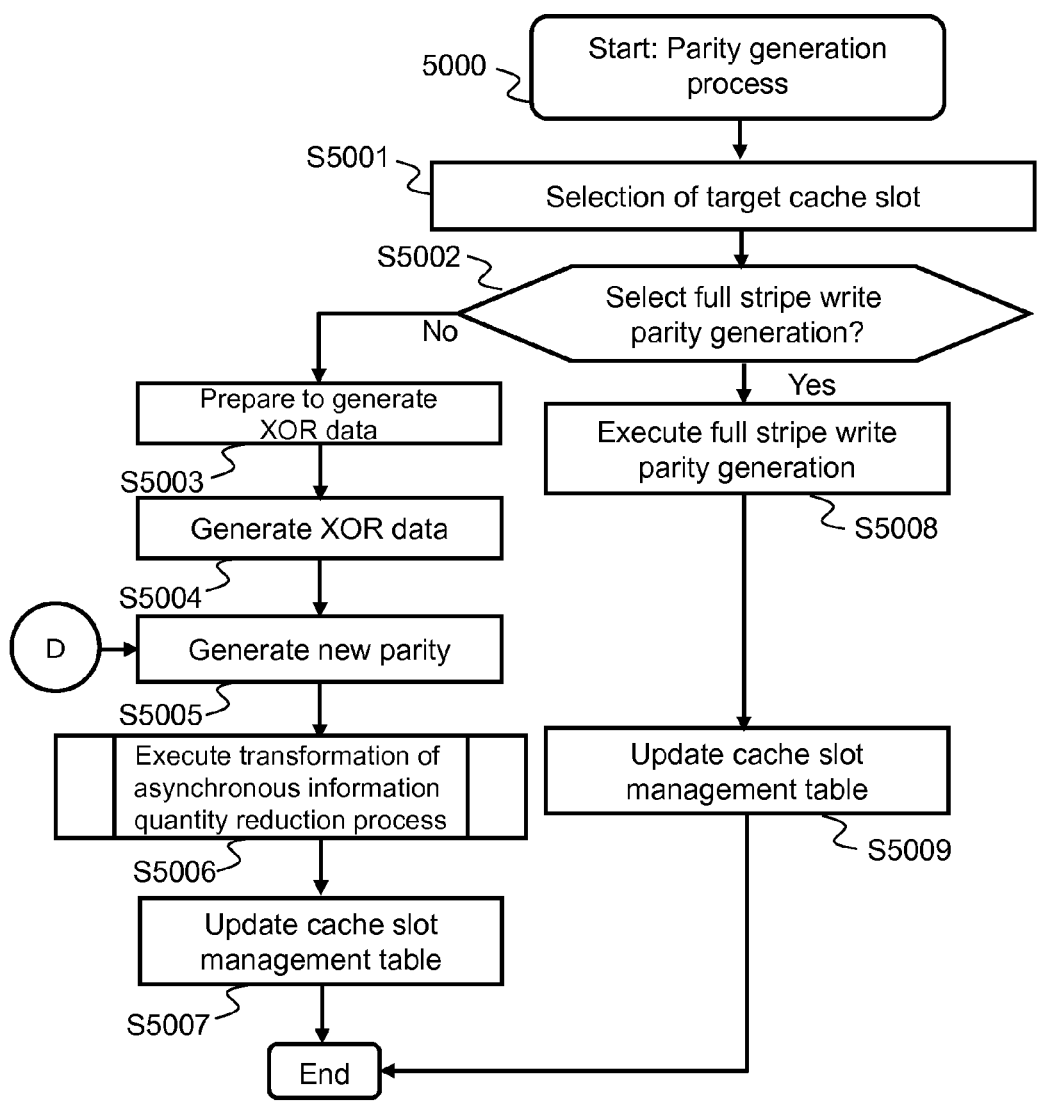
FIG. 17 is a diagram illustrating a flowchart for the parity generation process in Embodiment 1.

FIG. 17 is a flow chart of parity generation process 5000.

In parity generation process 5000, main storage 100L generates new parity corresponding to write data (referred to as new data) for which parity generation process has yet to be executed and stored in a cache segment managed in the cache slot.

Parity generation process 5000 is activated periodically by storage 100 at predetermined time intervals. For example, where the total volume of dirty data in cache memory 120 in storage 100 is large, it is possible to increase the frequency with which parity generation process 5000 is activated.

At S5001, main storage 100L selects one of the cache slots containing dirty data for which parity generation process has not been executed. The selected cache slot is referred to as the current cache slot.

At S5002, main storage 100L determines whether full stripe write parity generation should be selected for the dirty data managed in the current cache slot (selecting the method which has the least processing load). Where the determination result is "yes", main storage 100L proceeds to process S5008, and carries out full stripe write parity generation. Where the determination result is "no", main storage 100L proceeds to S5003, and carries out a modified write parity generation.

It should be noted that to reduce the quantity of information in the transfer data, in S5002 main storage 100L may be made to invariably proceed to S5003, and to invariably execute process S5006 to be described later (corresponding to information quantity reduction process in (4) of FIG. 26). For example, in S5002 main storage 100L can be configured to determine whether or not the cumulative amount of transfer data is equal to or larger than a threshold in the same way as in S4003, and where the determination result is "yes", to invariably proceed to process S5003.

At S5003, main storage 100L carries out preparation for the generation of XOR data. Specifically, a staging process is carried out on old data corresponding to the new data (also referred to as current old data). Main storage 100L then carries out a staging process on old parity corresponding to new data (also referred to as current old parity).

At S5004, storage 100 generates XOR data. Specifically, at S5003 main storage 100L calculates the XOR of current old data and the new data, generates XOR data and stores the generated XOR data (also referred to as current XOR data) in local memory 111.

At S5005, main storage 100L generates new parity corresponding to the new data. Specifically, main storage 100L generates new parity by calculating the XOR for the current XOR data and current old parity, storing the generated new parity in a cache segment (acquired as necessary).

At S5006, main storage 100L executes a transformation process for the asynchronous information quantity reduction process 4000 in FIG. 15. Specifically, in place of process S4001, main storage 100L carries out a process which selects one entry from the entries in transfer data management table 1500 corresponding to the current cache slot for which the value of information quantity reduction process completion flag 1504 is "incomplete". Moreover, main storage 100L skips step S4002. Subsequently, in processes S4003 to S4007, main storage 100L executes the process in FIG. 15.

However, main storage 100L executes the transformation process to be described below for the information quantity reduction subprocess Z 4100 activated at S4005 as well. In other words, in process S4101, in addition to copying the new data in cache memory to local memory 111, main storage 100L copies the old data read to cache memory 120 at S5003 to local memory 111. Moreover, main storage 100L skips the process of S4102 because the XOR data have already been generated at S5004. Still further, to avoid an infinite loop, main storage 100L skips process S4108. In the other steps of the process (S4103 to S4107), main storage 100L executes the process of FIG. 16.

Moreover, main storage 100L repeats the process of S5006 until there are no more entries with a value of "incomplete" for the information quantity reduction process completion flag 1504 among the entries of transfer data management table 1500. It should be noted that where there are a plurality of entries for which the value of information quantity reduction process completion flag 1504 is "incomplete", it is arranged that the process should be carried out in sequence from those entries of the write information/write sequence numbers 1502 for which the write sequence number value is smallest.

At S5007, main storage 100L appropriately updates the cache slot management table. At S5008, main storage 100L executes a full stripe write parity generation. It should be noted that main storage 100L needs to carry out an advance staging process for the data necessary in the parity generation process. At S5009, main storage 100L appropriately updates the cache slot management table.

The above has described the flowchart for parity generation process 5000. It should be noted that the description of the above parity generation process 5000 has described parity generation process 5000 with respect to main storage 100L, but the action of the process for parity generation process 5000 in subsidiary storage 100R is almost identical. However, with the parity generation process 5000 for subsidiary storage 100R, there is no need to carry out process S5006 relating to information quantity reduction process.

Moreover, the above description of parity generation process 5000 presumes that drive 170 is a general-purpose drive structure, but it is possible for drive 170 to be configured as a drive with an XOR execution function. However, in this case drive 170 is the agent of the generation of XOR data at S5004 and new parity generation at S5005 respectively.

With parity generation process 5000, the XOR data generated to execute parity generation in (8) of FIG. 26 (corresponding to the XOR data in S5004) can also be used in the information quantity reduction process of (4) in FIG. 26 (corresponding to S5006) so there is no need to generate XOR data separately for the information quantity reduction process (and in some cases there will be no need to read the old data). Because of this it is possible to reduce the load on controller 110 and drive 170 of main storage 100L.

Figure 18:
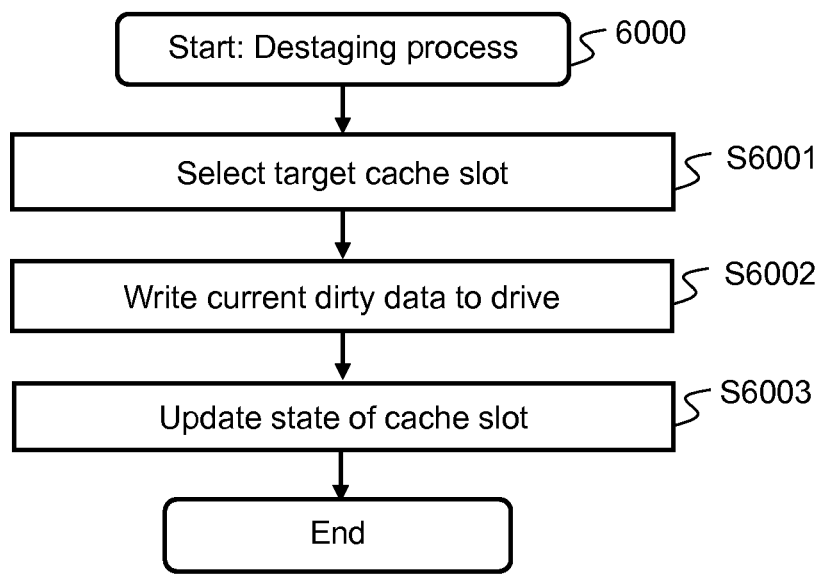
FIG. 18 is a diagram illustrating a flowchart for the destaging process in Embodiment 1 and Embodiment 2.

FIG. 18 is a flow chart for destaging process 6000.

Destaging process 6000 is periodically activated by storage 100 at predetermined time intervals. For example, where the total amount of dirty data in cache memory 120 of storage 100 is large, it is possible to increase the frequency with which destaging process 6000 is activated.

At S6001, main storage 100L selects a cache slot which is managing dirty data (write data and parity data) for which parity generation is complete as the cache slot targeted for destaging. The cache slot selected by main storage 100L is referred to as the current cache slot. At S6002, main storage 100L writes the dirty data (referred to as the current dirty data) in the cache segment (read cache segment) corresponding to the current cache slot into the corresponding drive 170. At S6003, main storage 100L appropriately updates the state of the current cache slot.

This completes the description of destaging process 6000.

Figure 19A:
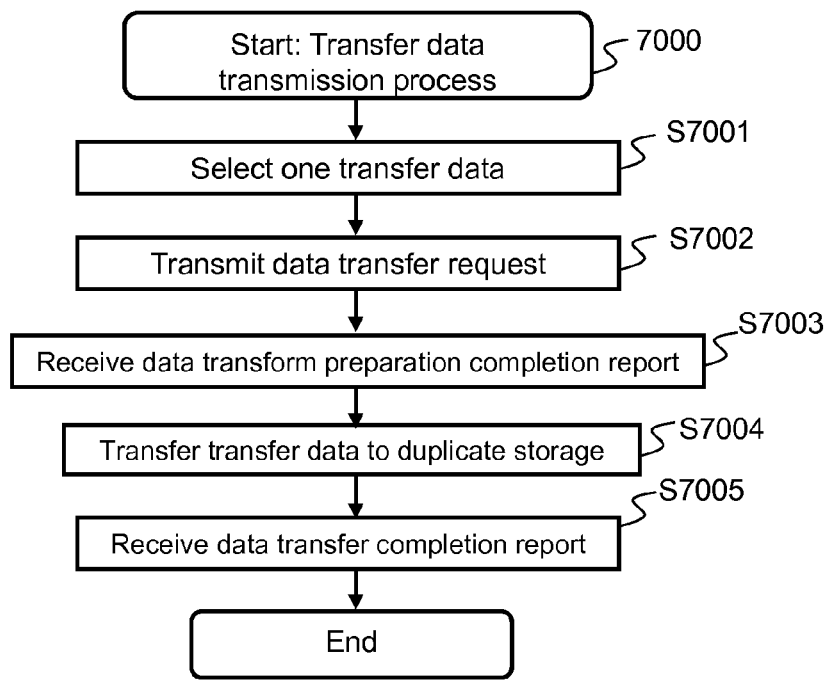
FIG. 19A is a diagram illustrating a flowchart for the transfer data transmission process in Embodiment 1.

FIG. 19A is a flow chart for transfer data transmission process 7000.

Transfer data transmission process 7000 is periodically activated by main storage 100L at predetermined time intervals. For example, where the value of the cumulative amount of transfer data 1703 exceeds the threshold configured in advance by managing terminal 500, it is possible to arrange the structure such that the time intervals over which transfer data transmission process 7000 are activated are made shorter and the activation frequency increased.

First, the process steps in the flow chart for transfer data transmission process 7000 (a program stored in local memory 111) will be described.

At S7001, main storage 100L selects one of the transfer data. Specifically, main storage 100L selects an entry from the entries of transfer data management table 1500 for which the write sequence number of the write information/write sequence number 1502 is smallest. Transfer data corresponding to the current entry is referred to as the current transfer data.

At S7002, main storage 100L transmits a data transfer request to subsidiary storage 100R. At S7003, main storage 100L receives a data transfer preparation completion report from subsidiary storage 100R. At S7004, main storage 100L transfers the current storage data to subsidiary storage 100R. At S7005, main storage 100L receives a data transfer completion report from subsidiary storage 100R. Subsequently, the current entries in transfer data management table 1500 are deleted in addition to deleting the current transfer data from cache memory 120 and primary journal volume 20L.

Figure 19B:
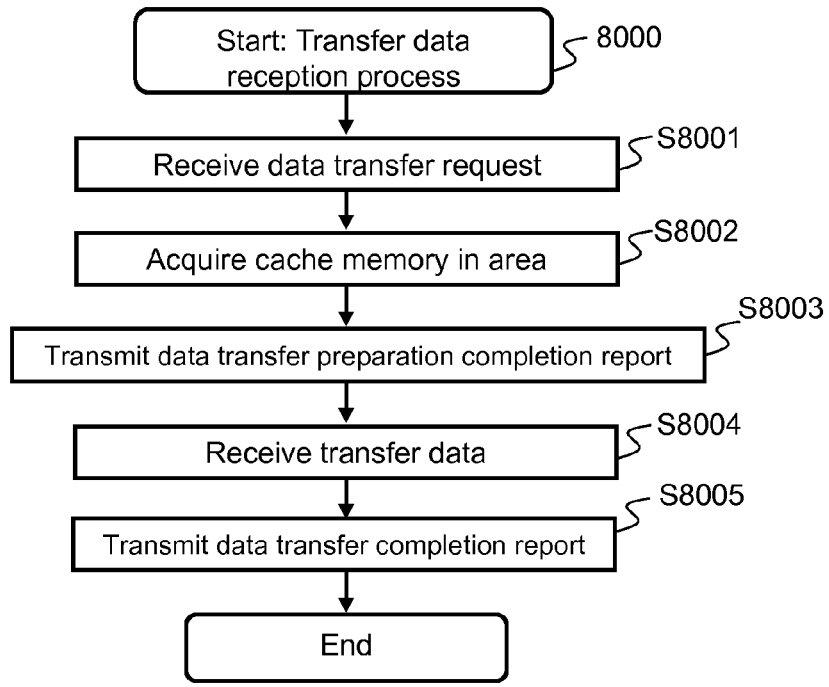
FIG. 19B is a diagram illustrating a flowchart for the transfer data reception process in Embodiment 1.

FIG. 19B is a flow chart for transfer data reception process 8000 (a program stored in local memory 111).

Transfer data reception process 8000 is activated by subsidiary storage 100R in accordance with a data transfer request received from main storage 100L.

At S8001, subsidiary storage 100R receives a data transfer request from main storage 100L. At S8002, subsidiary storage 100R acquires a cache segment corresponding to an open area of secondary journal volume 20R (it should be noted that subsidiary storage 100R acquires the appropriate cache slot). At S8003, subsidiary storage 100R transmits a data transfer preparation completion report to main storage 100L.

At S8004, subsidiary storage 100R receives a transfer data from main storage 100L, and stores the transfer data in the cache segment acquired at S8002. Hereinafter the stored transfer data is referred to as the current transfer data. Moreover, a new entry is added to the transfer data management table 1500 in subsidiary storage 100R, and the following initial values (1) to (5) are configured in each column for the new entries added. (1) Subsidiary storage 100R configures an identifier which uniquely identifies the current entry in the current table with ID 1501. (2) Subsidiary storage 100R configures the information of write information 35 within the current transfer data as write information of write information/write sequence number 1502, and configures write sequence number 36 in the current transfer data as the write sequence number. (3) Subsidiary storage 100R configures the information in subblock change presence bitmap 38 in the current transfer data to subblock change presence bitmap 1503. (4) Subsidiary storage 100R configures an invalid value to information quantity reduction process completion flag 1504. (5) Subsidiary storage 100R configures the address of an open area within secondary journal volume 20R in S8002 to journal volume address 1505. At S8005, subsidiary storage 100R transmits a data transfer completion report to main storage 100L.

That completes the description of the flow chart for data transfer process 7000 and data transfer reception process 8000.

FIG. 20 is a flow chart for transfer data writing process 9000.

Transfer data writing process 9000 is a process which writes new data containing transfer data stored in secondary journal volume 20R or a cache memory area corresponding to an area within secondary journal volume 20R (or new data generated from the XOR data contained in this transfer data) to duplicate volume 10R.

Transfer data writing process 9000 is periodically activated by subsidiary storage 100R at predetermined time intervals. For example, where the value of cumulative amount of transfer data 1703 exceeds a threshold determined in advance by management terminal 500, it is possible to shorten the time intervals over which data transfer writing process 9000 activates, and increase the frequency of activation.

At S9001, subsidiary storage 100R selects one transfer data. Subsidiary storage 100R employs the current write sequence number (not shown in the diagram) stored in shared memory 130 of subsidiary storage 100R for selection of the transfer data. The initial value of the current write sequence number is "0", but is increased by 1 after execution of the transfer data write process 9000. At S9001, subsidiary storage 100R selects an entry for which the value of the write sequence number of write information/write sequence number 1502 among the entries in transfer data management table 1500 of subsidiary storage 100R matches the current write sequence number. Transfer data corresponding to the selected entry is referred to as the current transfer data.

At S9002, subsidiary storage 100R specifies data designated by information in the current transfer data, and carries out a cache hit/miss determination on the specified data. Specifically, subsidiary storage 100R first specifies the logical volume number in duplicate volume 10R corresponding to the logical volume number in master volume 10L contained in write information 35 of the current transfer data (it should be noted that the correspondence relationship between master volume 10L and duplicate volume 10R is managed by remote copy management table 1600). Subsidiary storage 100R then carries out a cache hit/miss determination based on the identifier of the virtual device specified from information on the specified logical volume and, the LBA and size contained in the write information 35.

At S9003, subsidiary storage 100R carries out the acquisition of a cache slot and cache segment as required. The specific procedure for the process is virtually identical to those in S3005, S3007. However, unlike with S3005, the initial values are designated as follows for each of the columns in the entries of cache slot management table 1400 (only the difference to the configuration for the initial value in S3005 will be discussed here). (3) Subsidiary storage 100R designates an invalid value for the necessary data lost bitmap 1403.

The cache slot acquired in S9003 or the cache slot found at S9002 are referred to as the current cache slot. The cache segment acquired at S9003 or the cache segment found at S9002 are referred to as the current cache segment.

At S9004, subsidiary storage 100R refers to information quantity reduction processing identifier 1706 in system information management table 1700, and determines whether or not its value is "XOR data". Where the determination result is "yes" (where the value is "XOR data"), subsidiary storage 100R proceeds to process S9007. Moreover, where the determination result is "no" (where the value is "discard" or "0 fill"), subsidiary storage 100R proceeds to process S9005.

Where the determination result is "yes", the XOR data is stored in payload 32 of the current transfer data (referred to hereinafter as the current XOR data). Moreover, where the determination result is "no", new data is stored in payload 32 of the current transfer data (referred to hereinafter as the current new data or the current write data).

At S9005, subsidiary storage 100R writes the current new data into a cache memory area corresponding to duplicate volume 10R. The specific content of the process differs according to whether the value of information quantity reduction process classifier 1706 of system information management table 1700 is "0 fill" or "discard".

Where the value of the information quantity reduction process classifier 1706 is "0 fill", subsidiary storage 100R writes the subblock (group) in payload 32 of the current transfer data corresponding to bits for which the bit value of the subblock change presence bitmap 38 in the current transfer data is "1" to a corresponding position in the current cache segment.

Where the value of the information quantity reduction process classifier 1706 is "discard", the process is almost identical to that where the value of the information quantity reduction process classifier 1706 is "0 fill". However, where the value of the information quantity reduction process classifier 1706 is "discard", as the subblock (group) corresponding to bits for which the bit value of the subblock change presence bitmap 38 in the current transfer data is "1" is left-justified in payload 32 of the current transfer data, subsidiary storage 100R takes note of this.

At S9006, subsidiary storage 100R appropriately updates the cache slot management table. At S9007, subsidiary storage 100R carries out a staging process for old data corresponding to the current XOR data (referred to as the current old data).

At S9008, subsidiary storage 100R generates new data by calculating the XOR of the current old data and the current XOR data. Subsequently, subsidiary storage 100R stores the generated new data in the current cache segment acquired in S9003.

At S9009, where drive 170 is a "general-purpose drive", subsidiary storage 100R does nothing (the new parity is generated at parity generation process 5000). On the other hand, where drive 170 is a drive with an XOR execution function, following the process of (c) in FIG. 25, new parity is generated using the current XOR data. At S9010, subsidiary storage 100R appropriately updates cache slot management table 1400.

The value of information quantity reduction process classifier 1706 at S9004 is configured by system information configuring process 14000 to be described later. The advantage of configuring the value of information quantity reduction process classifier 1706 to "0 fill" or "discard" is that subsidiary storage 100R prepares all data necessary at S9007 (current old data), and calculation of the XOR for the current old data and XOR data at S9008 does not require the generation of new data, only the writing of current new data (current write data) to cache memory 120R corresponding to duplicate volume 10R at S9005, reducing the processing load on controller 110 and drive 170.

It should be noted that where drive 170 is a "drive with XOR execution function", there is no need to prepare old data at S9007, and the agent of generation of new data at S9008 is drive 170.

The operation of the processes of system information configuration process 14000, system quantity reduction target configuration process 15000, and cache resident target configuration process 16000 stored in memory 510 of management terminal 500 will now be described.

The operation of the process of system information configuration process 14000 will be described first. In system information configuration process 14000, storage 100 follows user indications via management terminal 500 configuring respective values for (1) synchronous information quantity reduction flag 1705, (2) information quantity reduction process classifier 1706, and (3) information quantity reduction process timing 1707 in information management table 1700. It should be noted that the value of (1) synchronous information quantity reduction flag 1705 can be set to be automatically configured dynamically by main storage 100L, but in this case the result is as described with regard to FIG. 13.

The action of information quantity reduction target configuration process 15000 will now be described.

With information quantity reduction target configuration process 15000, storage 100 follows user indications via management terminal 500, and configures respective values for the "information quantity reduction process execution flag" and "information quantity reduction process execution area" columns in logical volume management table 1200. Here information regarding whether or not the aforementioned information quantity reduction process should be executed on the current logical volume is stored in the "information quantity reduction process execution flag", and information indicating the data from which area of the current logical volume the above-mentioned information quantity reduction process should be executed is stored in the "information quantity reduction process execution area". It should be noted that the history of write information 35 contained in transfer data 30 transmitted by main storage 100L through remote copying is managed as a statistical quantity, and based on this statistical quantity an area of master volume 10L is specified to frequently become the target of transfer, it being possible to configure the arrangements so that this specified area is automatically configured by main storage 100L as the "information quantity reduction process execution area". This means it is for example possible to reduce the amount of information in the transfer data while suppressing the processing load on controller 110 and the like through the information quantity reduction process, in addition to being able to cut out the need of user configuration.

The action of the process of cache resident target configuration process 16000 will now be described. With cache resident target configuration process 16000, indications are received from the user via management terminal 500, and respective values configured in (1) the cache resident execution flag, (2) the cache resident execution area, which are columns in logical volume management table 1200. Here information relating to whether the "cache resident process" has been executed or not with regard to the current logical volume ("executed" or "not executed") is stored in (1) cache resident execution flag, and information indicating the data from which area of the current logical volume the "cache resident process" should be executed is stored in (2) cache resident execution area. It should be noted that main storage 100L manages the history of the write information contained in the write commands to master volume 10L as a statistical quantity, and that the area of master volume 10L which is frequently the target of writing is specified based on this statistical quantity, and it can be arranged that main storage 100L automatically configures the specified area in (2) cache resident execution area. By this means, while suppressing cache resident quantity 1702 it is possible for example to improve the possibility of executing the information quantity reduction process with the execution of S11011 in FIG. 22 to be described later or S3012 in FIG. 8, in addition to cut out the need of user configuration.

Embodiment 2

Using FIGS. 21 to 27, a computer system of Embodiment 2 will now be described.

Embodiment 2 illustrates the structure in which synchronous remote copying is carried out using computer system 1. In Embodiment 2, in the same way as for Embodiment 1, main storage 100L is able to synchronize the content of master volume 10L and duplicate volume 10R by transmitting transfer data which has been compressed to a small size via WAN after reduction of the quantity of information in the transfer data without a copy of the master volume. Embodiment 2 as described above corresponds to patterns (e) or (f) in FIG. 27.

It should be noted that Embodiment 2 includes a large number of parts that are shared with Embodiment 1. For example the structure of the computer system of Embodiment 2 is identical to that in FIG. 1. Moreover, the structure of the hardware of storage 100 in Embodiment 2 is identical to that of FIG. 2. However, primary journal volume 20L and secondary journal volume 20R are not employed in Embodiment 2.

Moreover, the data structure for the transfer data in Embodiment 2 is identical to FIG. 3. However, with Embodiment 2, as the write sequence number 36 is not used, write sequence number 36 is either constantly configured to an invalid value, or no actual storage space is provided for write sequence number 36 in the transfer data 30.

Moreover, the overall schematic of Embodiment 2 is identical to that illustrated in the description of FIG. 26. Moreover, the string of patterns relating to the various processes for execution timing in FIG. 27 in Embodiment 2 is identical to those illustrated in the description of FIG. 27. Moreover, the conceptual operation of a drive with an XOR execution function in Embodiment 2 is identical to that illustrated in the description of FIG. 25.

In the following description of Embodiment 2, emphasis will be placed on those parts that differ from Embodiment 1.

Figure 21:
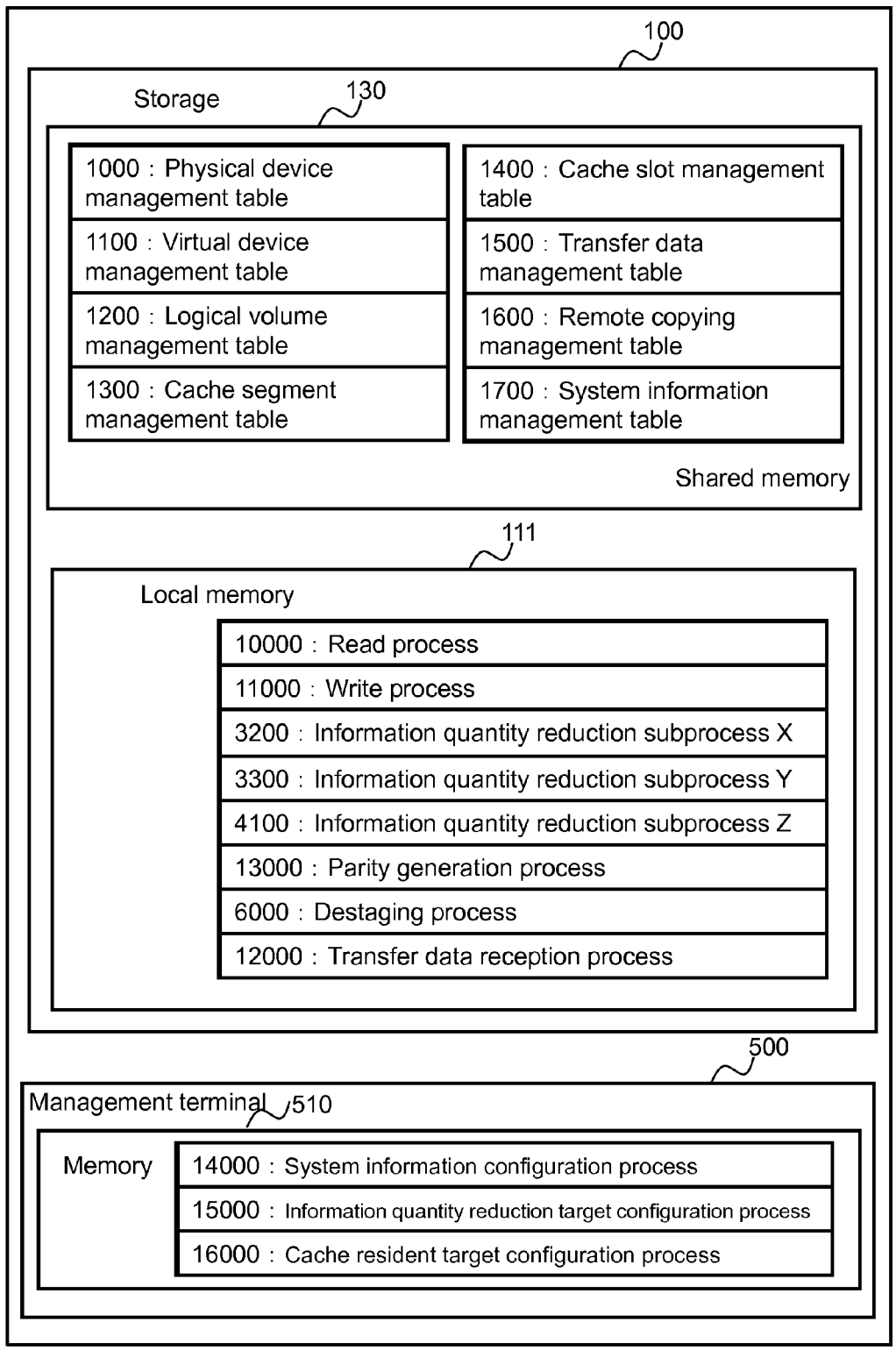
FIG. 21 is a diagram illustrating a configuration of the logical structure for the shared memory and local memory of the storage, and the memory in the management terminal in Embodiment 2.

FIG. 21 is a diagram illustrating shared memory 130 in storage 100, local memory 111, and the logical structure of memory 510 in management terminal 500 in Embodiment 2.

The table stored in shared memory 130 in FIG. 21 is identical to the table stored in shared memory 130 in FIG. 4.

However, with Embodiment 2, as necessary data lost bitmap 1403 of cache slot management table 1400 is not used, the corresponding column is set to an invalid value.

Moreover, with Embodiment 2, as (1) write sequence number of write information/write sequence number 1502 and (2) information quantity reduction process completion flag 1504 of transfer data management table 1500 are not used, the corresponding column is set to an invalid value.

Moreover, acceptance flag 1708 for XOR data in the cache memory of system information control table 1700 is a new column used in Embodiment 2. Acceptance flag 1708 for the XOR data in cache memory is a flag which designates whether or not to accept the storage of XOR data (see "XOR data" and the like in FIG. 26) in place of the new data (see "new data" and the like in FIG. 26) in cache memory 120R of subsidiary storage 100R, and the values it can have are either "accepted" or "not accepted".

Where XOR data is present in place of the new data in cache memory 120R, it is necessary to carry out a process in parity generation process 13000 and read process 10000 to be described later which takes into consideration that it is XOR data. The effect of having the "accepted" value for acceptance flag 1708 for XOR data in the cache memory will be described later.

Moreover, XOR data bitmap 1405 in cache slot management table 1400 is a new column used in Embodiment 2. The bits of XOR data bitmap 1408 correspond to subblocks, and the bit values indicate whether or not the XOR data is included in a subblock of the cache segment (write cache segment) corresponding to the current bit. Where the bit value of bits in the XOR data bitmap 1405 is "0", it indicates that "the current subblock is not XOR data", and where the bit value is "1", it indicates that "the current subblock is XOR data".

Programs for read process 10000, write process 11000, information quantity reduction subprocess X 3200, information quantity reduction subprocess Y 3300, information quantity reduction subprocess Z 4100, parity generation process 13000, staging process 6000, and transfer data reception process 12000 are stored in local memory 111 of FIG. 21.

The various types of process program stored in memory 510 in FIG. 21 are identical to the various types of process program stored in memory 510 in FIG. 4.

In what follows the action of the various process programs stored in memory 510 and local memory 111 will be described. The action of write process 11000 will be described first with reference to the flow chart in FIG. 22.

S11001 to S11009 are virtually identical to S3001 to S3009 respectively in FIG. 8. However, unlike S3008 in S11008 an invalid value is configured for the write sequence number of write information/write sequence number 1502 of transfer data management table 1500. Moreover, as transfer data 30 stored in the cache segment at S11009 is ultimately erased at S11014 without being written to primary journal volume 20L, primary journal volume 20L is not used.

At S11010, main storage 100L determines whether the determination result of the cache hit/miss at S11003 was a "hit" or a "miss". Where it was a "hit", main storage 100L proceeds to process S11011. Where it was a "miss", main storage 100L proceeds to process S11012.

At S11011, process "A" in FIG. 9 is activated. The content of process "A" in FIG. 9 is identical to that in Embodiment 1. At S11012, process "B" in FIG. 13 is activated. The content of process "B" in FIG. 13 is identical to that of Embodiment 1.

At S11013, main storage 100L transmits a data transfer request to subsidiary storage 100R. Thereafter main storage 100L receives a data transfer preparation completion report from subsidiary storage 100R. Main storage 100L then transmits the transfer data acquired at S11009 to subsidiary storage 100R. It should be noted that write information 35 of transfer data 30 acquired at S11009 is contained in the data transfer request.

At S11014, main storage 100L receives a data transfer completion report from subsidiary storage 100R. Thereafter main storage 100L deletes the current entries of transfer data management table 1500 together with deleting the current transfer data from cache memory 120.

At S11015, main storage 100L appropriately updates the cache slot management table. At S11016, main storage 100L sends a write completion report to host 200L and terminates write process 11000.

The action of information quantity reduction subprocess X 3200 in this embodiment is identical to that in FIG. 11. Moreover, the action of information quantity reduction subprocess Y 3300 in this embodiment is identical to that of FIG. 12.

Moreover, the action of information quantity reduction subprocess Z 4100 in this embodiment is virtually identical to FIG. 16. However with Embodiment 2, parity generation process 5000 in S4108 needs to be replaced with parity generation process 13000.

Figure 23:
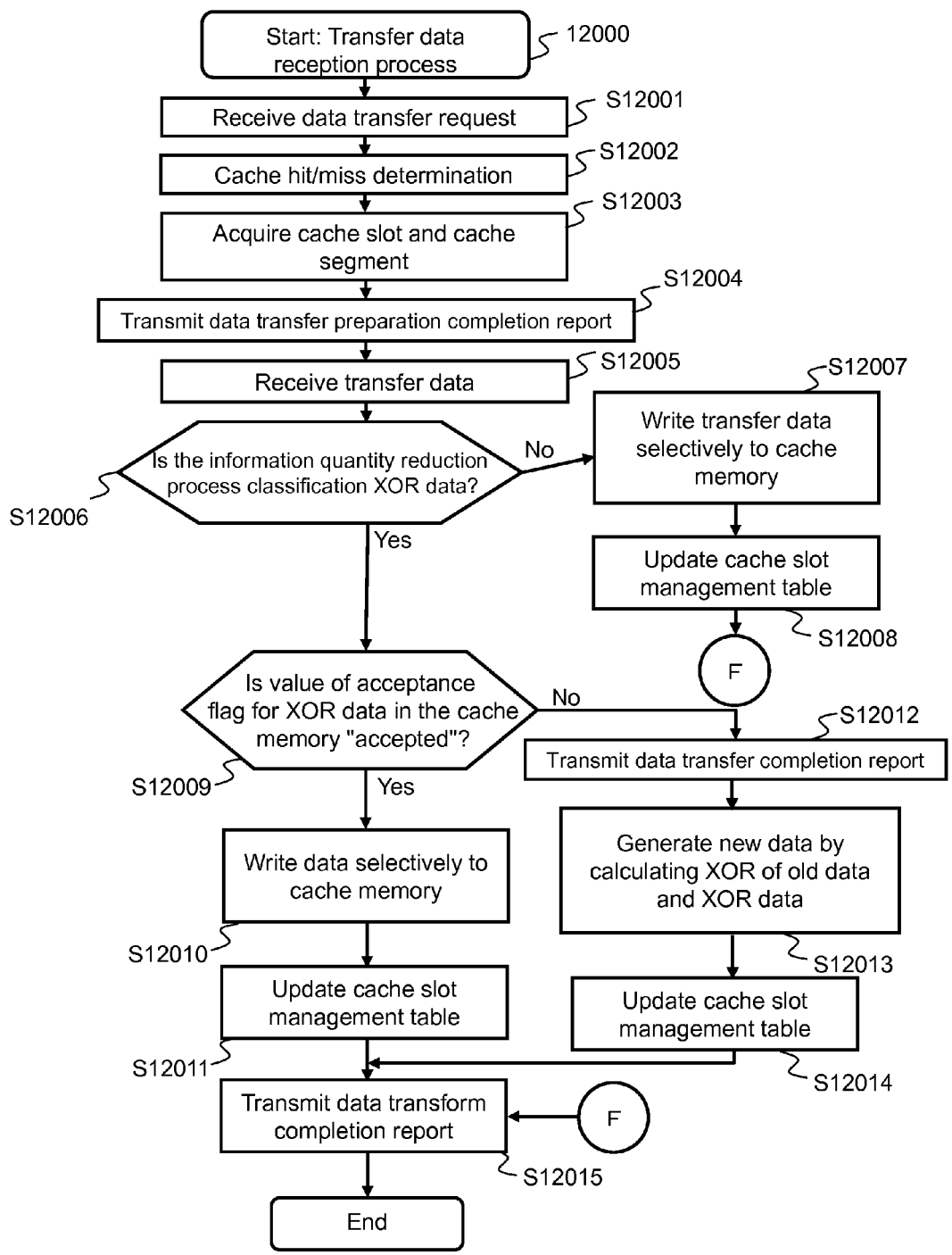
FIG. 23 is a diagram illustrating a flowchart for the transfer data reception process in Embodiment 2.

The action of transfer data reception process 12000 will now be described with reference to the flowchart in FIG. 23.

At S12001, subsidiary storage 100R receives a data transfer request from main storage 100L. The received data transfer request will be referred to as the current data transfer request.

At S12002, subsidiary storage 100R specifies the write data for duplicate volume 10R designated by the write information in the current data transfer request, and carries out a cache hit/miss determination for the specified write data. Specifically, subsidiary storage 100R first of all specifies the logical volume number of the duplicate volume 10R corresponding to the logical volume number of master volume 10L contained in the write information of the current data transfer request. Subsidiary storage 100R then carries out a cache hit/miss determination based on information in the virtual device corresponding to the specified logical volume and LBA and size information contained in the write information.

At S12003, subsidiary storage 100R acquires a cache slot and cache segment (write cache segment) as necessary. Specifically, the procedure for the process is identical to S9003. The cache slot acquired at S12003 or the cache slot found at S12002 are referred to as the current cache slot. Moreover, the cache segment acquired at S12003 or the cache segment found at S12002 are referred to as the current cache segment.

At S12004, subsidiary storage 100R transmits a data transfer preparation completion report to main storage 100L. At S12005, subsidiary storage 100R receives transfer data 30 transmitted from main storage 100L in buffer 151. The received transfer data 30 is referred to as the current transfer data.

At S12006, subsidiary storage 100R refers to the value of information quantity reduction process classifier 1706 in information management table 1700, and where this value is "XOR data", proceeds to process S12009. Where this value is a value other than this ("discard" or "0 fill"), subsidiary storage 100R proceeds to process S12007. Where the value is "XOR data", the data contained in payload 32 of the current transfer data is XOR data, and this XOR data is referred to as current XOR data.

At S12007, subsidiary storage 100R writes data in the transfer data selectively to the cache memory. The specific content of the process will differ depending on whether the value of information quantity reduction process classifier 1706 in system information management table 1700 is "0 fill" or "discard".

Where the value of the information quantity reduction process classifier 1706 is "0 fill", subsidiary storage 100R writes the data in the subblock (groups) within payload 32 of the current transfer data corresponding to bits for which the bit value of subblock change presence bitmap 38 in the current transfer data is "1" to a corresponding position in the current cache segment. Here the data written to the cache segment is referred to as new data or current write data.

The process where the value of the information quantity reduction process classifier 1706 is "discard" is virtually identical to the process where the value of information quantity reduction process classifier 1706 is "0 fill". However, where the value of information production quantity process classifier 1706 is "discard", subblocks (groups) corresponding to the bits for which the bit value of the subblock change presence bitmap 38 in the current transfer data is "1" are left-justified in payload 32 of the current transfer data, hence, process by this subsidiary storage 100R needs to be carried out by taking into account the above.

At S12008, subsidiary storage 100R appropriately updates the cache slot management table 1400. At S12009, subsidiary storage 100R refers to the value of acceptance flag 1708 for XOR data in the cache memory of system information management table 1700, and determines whether this value is "accepted". Where the determination result is "yes", (where the value is "accepted"), subsidiary storage 100R proceeds to process S12010. Moreover, where the determination result is "no" (where the value is "not accepted") subsidiary storage 100R proceeds to process S12012.

Figure 22:
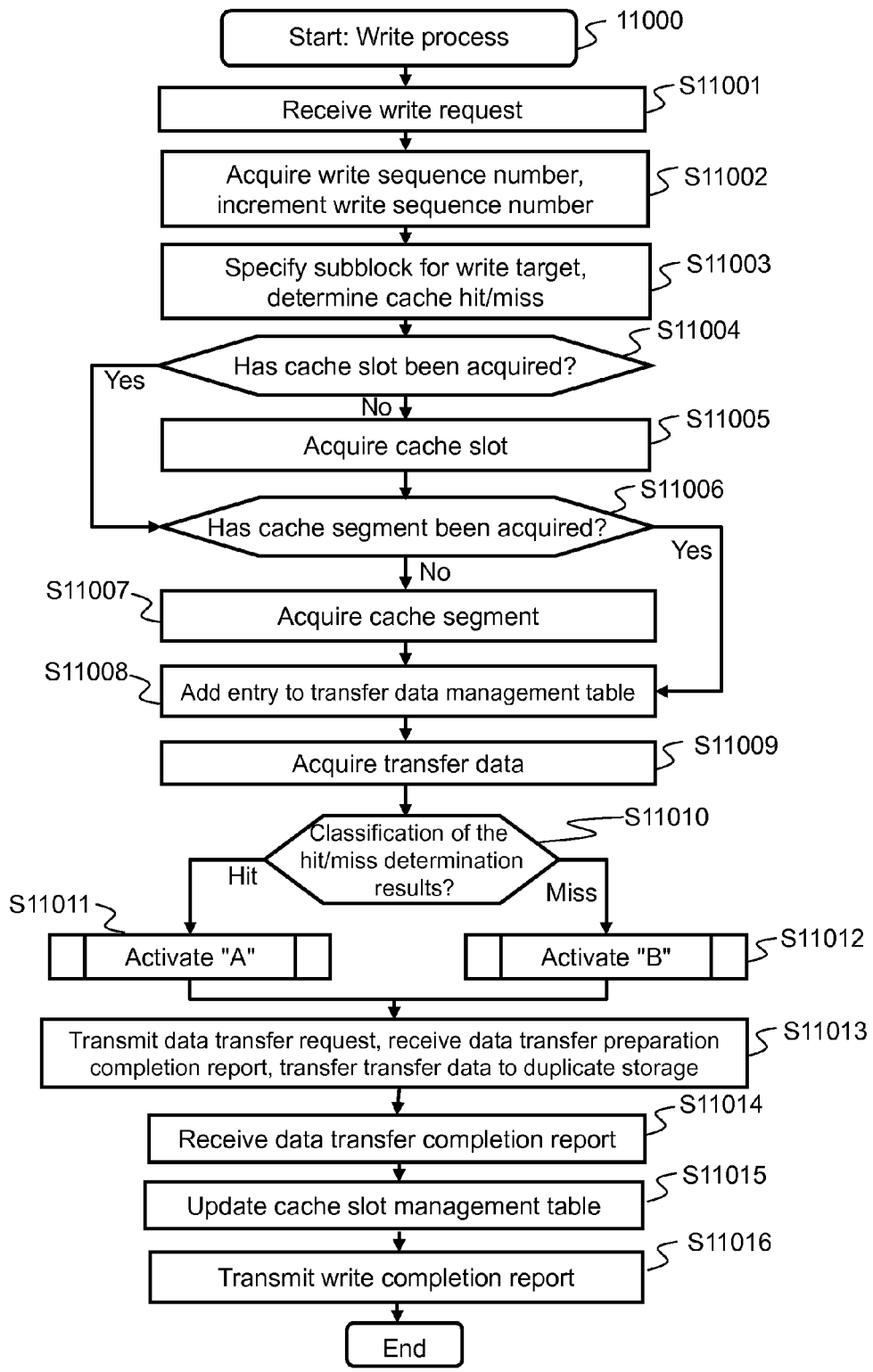
FIG. 22 is a diagram illustrating a flowchart for the write process in Embodiment 2.

The effect of setting the value of acceptance flag 1708 for XOR data in cache memory to "accepted" is that it is possible to reduce the time from the start of transfer data reception process 12000 to transmission of the data transfer completion report at S12015 to be described later, as there is no need to carry out new data generation at S12013, or to read old data at S12012 to be described later, and as a result it is possible to reduce the write response time (the time from S11001 to S11016 in FIG. 22).

At S12010, subsidiary storage 100R selectively writes the XOR data contained in the current transfer data (or data generated from the XOR data contained in the current transfer data) to the cache memory. The specific process of S12010 differs depending on the result of the cache hit/miss determination at S12002.

The process where the results of the cache hit/miss determination is "host dirty hit" will be described first. Subsidiary storage 100R calculates the XOR for the subblock of current XOR data corresponding to bits where the bit value of subblock change presence bitmap 38 in the current transfer data is "1" (referred to as the current data) and the subblock of the current cache segment corresponding to the current bit, and writes the data obtained from the calculation to the subblock of the current cache segment.

Where the determination result of the cache hit/miss is other than "host dirty hit", subsidiary storage 100R writes the subblock of the current XOR data corresponding to the current bit to a corresponding position in the current cache segment. Moreover, subsidiary storage 100R configures the bit of the current entry of XOR data bitmap 1405 corresponding to the current bit to "1" when the entry of the cache slot management table 1400 corresponding to the current cache slot is referred to as the current entry.

At S12011, subsidiary storage 100R appropriately updates the cache slot management table 1400. At S12012, subsidiary storage 100R carries out a staging process for old data corresponding to the current XOR data (current old data). At S12013, subsidiary storage 100R generates new data by calculating the XOR for the current old data and the current XOR data, and writes the generated new data to the current cache segment.

At S12014, subsidiary storage 100R updates cache slot management table 1400. The specific process is identical to the process of S3015 in FIG. 8. At S12015, subsidiary storage 100R transmits a data transfer completion report to main storage 100L.

Figure 24:
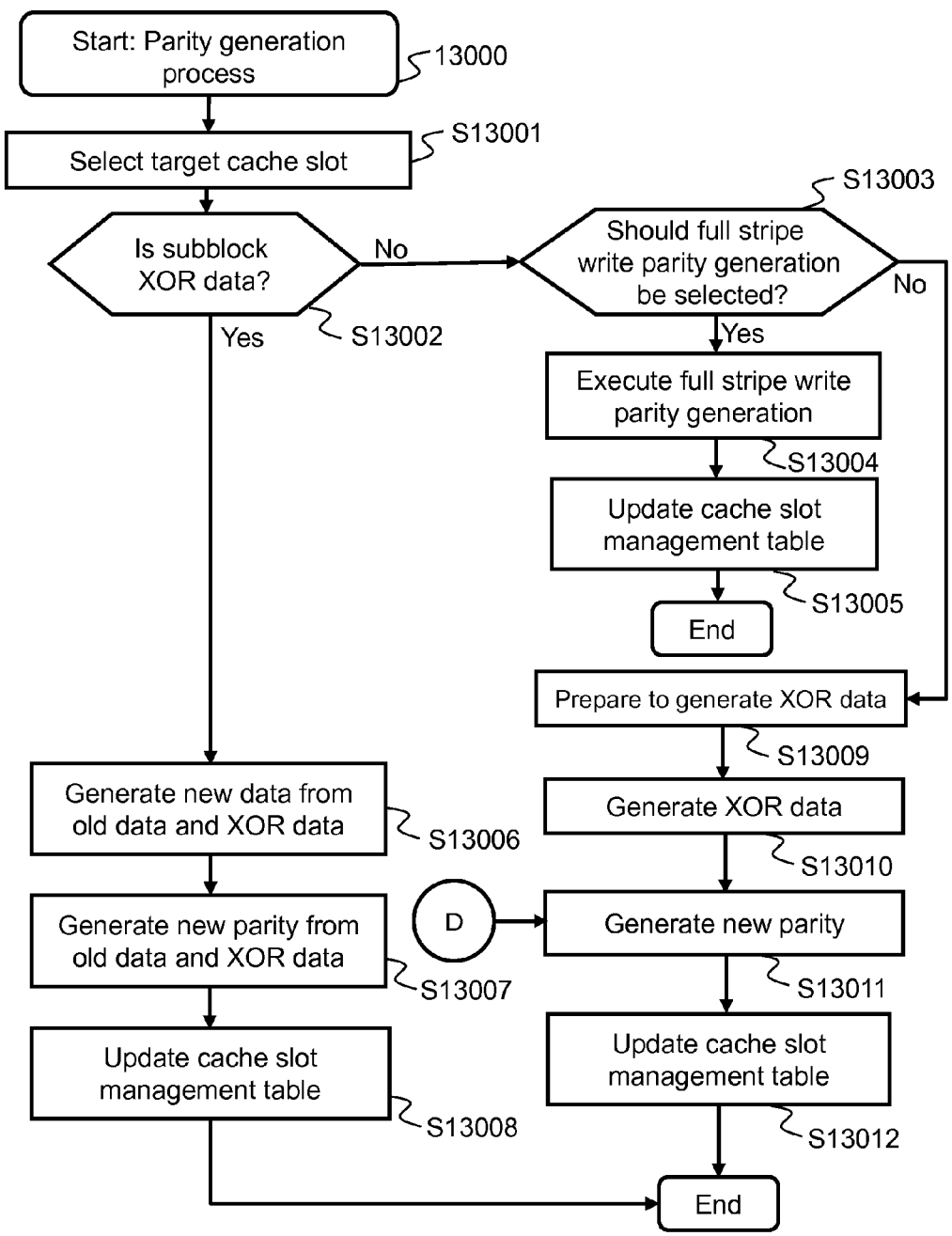
FIG. 24 is a diagram illustrating a flowchart for the parity generating process in Embodiment 2.

The value of information quantity reduction processing classifier 1706 in S9004 is configured in the above-mentioned system information configuration process 14000, but the advantage of configuring the value of information quantity reduction process classifier 1706 as "0 fill" or "discard" is that it is sufficient simply to selectively write the write data contained in the current transfer data to the cache memory area corresponding to duplicate volume 10R at S12007 without needing to (1) prepare old data as necessary at S12012, (2) generate XOR data at S12013, and (3) execute processes S13006 and S13007 at parity generation process 13000 of FIG. 24 to be described later. By this means it is possible to reduce the processing load on controller 110 and the like.

It should be noted that where drive 170 is a "drive with an XOR execution function", the readout of old data at S12012 may be omitted, and that the agent of the generation of new data at S12013 is drive 170.

The action of parity generation process 13000 will now be described with reference to the flow chart in FIG. 24. Parity generation process 13000 has a processing content which is shared with main storage 100L and subsidiary storage 100R.

At S13001, storage 100 selects one cache slot containing dirty data for which parity generation process has not been executed. The selected cache slot is referred to as the current cache slot.

The processes of S13002 to S13012 must be executed for the subblocks of dirty data managed by the current cache slot. In what follows subblocks targeted for processing are referred to as the current subblocks. Moreover, the cache segments in which the current subblocks are stored are referred to as current write cache segments.

At S13002, storage 100 determines whether or not the current subblock is XOR data. Specifically, storage 100 refers to the XOR data bitmap 1405 entry in cache slot management table 1400 corresponding to the current cache slot, and determines whether or not the bit of the XOR data bitmap 1405 corresponding to the current subblock is "1" (indicating that the current subblock is XOR data).

Where the determination result is "yes", storage 100 proceeds to process S13006. In what follows, data containing the current subblock is referred to as the current XOR data. Moreover, where the determination result is "no", storage 100 proceeds to process S13003. In what follows data contained in the current subblock is referred to as current new data.

At S13003, storage 100 determines whether or not full stripe write parity generation should be selected for the dirty data managed by the current cache slot (in other words, storage 100 selects the method with the least processing load).

Where the determination result is "yes", storage 100 proceeds to process S13004, and carries out a full stripe write parity generation. Moreover, where the determination result is "no", storage 100 proceeds to process S13009, and carries out a read modify write parity generation.

The order for the processes S13004 to S13005 is identical to the procedure for S5008 to S5009 in FIG. 17 respectively.

At S13006, storage 100 generates new data from the old data and XOR data. Specifically, storage 100 first carries out a staging process on the old data corresponding to the current XOR data (referred to as current old data). Next storage 100 generates new data by calculating the XOR for the current XOR data and current old data, and stores the generated new data in a corresponding position in the current write cache segment in which the current XOR data is stored.

At S13007, storage 100 generates new parity (referred to as the current new parity) from the old parity and XOR data. Specifically, storage 100 first of all carries out a staging process for the old parity corresponding to the current XOR data (referred to as the current old parity). Next storage 100 generates a current new parity by calculating the XOR for the current XOR data and the current old parity, and stores the generated current new parity in a cache segment (acquired where necessary).

At S13008, the cache slot management table is appropriately updated. It should be noted that in S13008, storage 100 has to perform a process which updates the bit of XOR data bitmap 1405 corresponding to the current XOR data to "0".

The processes of S13009 to S13012 are identical to the processes of S5003 to S5005 and S5007 respectively in FIG. 17.

It should be noted that where drive 170 is "a drive with XOR execution function", the agent for the generation of new data at S13006, the generation of new parity at S13007, the generation of XOR data at S13010, and the generation of new parity at S13011 is drive 170. Moreover, where drive 170 is a "drive with XOR execution function", it is possible to omit the staging process for old data and old parity in S13009.

Destaging process 6000 in this embodiment will now be described. The action of destaging process 6000 in this embodiment is identical to that in FIG. 18.

The action of read process 10000 will now be described. The action of read process 10000 is virtually identical to the action of the read process previously described. However, with subsidiary storage 100 there are cases where the bit of XOR data bitmap 1405 of cache slot management table 1400 previously described is "1" (where the current subblock is XOR data), and the action of the read process for a subblock where the bit of the XOR bitmap 1405 is "1" (referred to as the current subblock) differs from the normal read process.

Where there is a read request from host 200R (or from main storage 100L) for the current subblock of subsidiary storage 100R, subsidiary storage 100R generates new data corresponding to the current XOR data from the old data corresponding to the current XOR data and the current XOR data in a process identical to S13006 in FIG. 24 as the XOR data (referred to as current XOR data) is stored in the current subblock, and transmits the generated new data to the origin of the read request. It should be noted that subsidiary storage 100R may be arranged to carry out process S13007 in the same diagram together with S13006 in FIG. 24.

It should be noted that the actions of system information configuration process 14000, information quantity reduction target configuration process 15000 and cache resident target configuration process 16000 in this embodiment are identical to that of Embodiment 1.

The invention is not limited to the structures in the above described embodiments, and it goes without saying that variations may be made without departing from the scope of the invention.

For example, it is possible to use RAID 6 in place of RAID 5 as the RAID level for the RAID technology. This is because parity generation based on XOR is used in RAID 6 as well.

REFERENCE SIGNS LIST

1 Computer system
10L Master volume
10R Duplicate volume
20L Primary journal volume
20R Secondary journal volume
30 Transfer data
31 Transfer data management information
32 Payload
33 Subblock
34 Guarantee code
35 Write information
36 Write sequence number
37 Information quantity reduction management information
38 Subblock change presence bitmap
100L Storage (main storage)
100R Storage (subsidiary storage)
200 Host

The invention claimed is:

1. A storage system which is a main storage system provided with a first storage medium group formed of that is a plurality of first storage media, and a controller having a memory temporarily storing data comprising a prescribed number of subblocks stored in the first storage medium group, and which communicates with a subsidiary storage system having a second storage medium group formed of a plurality of second storage media containing second storage media in which data identical to the data stored in any of the first storage media in the first storage medium group is stored, wherein the controller receives from a higher-level device new data which is data updated from old data that is data stored in any of the first storage media of the first storage medium group and stores the received new data in the memory, reads the old data from the first storage medium group and stores the old data read into the memory, generates transfer data which is data used to replicate in the subsidiary storage system the new data with a quantity of information less than the new data on the basis of a difference between the old data and the new data in the memory, and transmits the transfer data to the subsidiary storage system, reads an old parity which is a parity corresponding to the old data from the first storage medium group and stores in the memory the old parity that has been read, and generates a new parity which is a parity updated from the old parity on the basis of the old parity in the memory and XOR data which is the exclusive logical sum of the new data and old data in the memory and stores the new parity in the first storage medium group, wherein the difference is the XOR data, and the transfer data contains:

positional data indicating the position of old subblocks targeted for updating among the plurality of old subblocks that are the plurality of subblocks comprising the old data; and updated data containing new target subblocks which correspond to the old subblocks targeted for updating and which are some of the plurality of new subblocks that are the plurality of subblocks comprising the new data, the controller determines whether or not bit values are all zero for each of the plurality of XOR subblocks which are the plurality of subblocks that comprise the XOR data and generates positional data on the basis of the position of the XOR subblocks for which the bit values are all zero.

2. A storage system in claim 1, wherein each of the subblocks is associated with a guarantee code,
the controller determines that the bit values are not all zero without reference to the XOR data for the XOR subblocks corresponding to subblock positions for which the guarantee codes differ between the old data and the new data and determines whether or not the bit values are all zero for the XOR subblocks corresponding to subblocks for which the guarantee code between the old data and the new data is the same by referring to the XOR data.

3. A storage system in claim 1, wherein the transfer data is the XOR data.

4. A storage system in claim 1, wherein
the difference is the XOR data,
the controller uses the XOR data already generated to generate a new parity, thereby generating the transfer data when new parity is generated using the XOR data.

5. A storage system in claim 1, wherein
the difference is the XOR data,
the controller uses the XOR data already generated to generate the transfer datam, thereby generating new parity when the transfer data is generated using the XOR data.

6. A storage system in claim 1, wherein
the controller receives a write command for the write target data, which is a base of the new data, from an upper-level device, and after generating transfer data and new parity, returns a response to the write command to the upper level device, wherein the controller uses the XOR data already generated to generate the new parity thereby generating the transfer data when the new parity is generated using the XOR data.

7. A storage system in claim 1, wherein
the controller receives a write command for the write target data, which is a base of the new data, from an upper-level device, and after generating transfer data and new parity, returns a response to the write command to the upper level device, wherein the controller uses the XOR data already generated to generate the transfer data, thereby generating the new parity when the transfer data is generated using the XOR data.

\* \* \* \* \*